US006970225B2

(12) United States Patent
Tanaka et al.

(10) Patent No.: US 6,970,225 B2
(45) Date of Patent: Nov. 29, 2005

(54) ELECTROOPTIC DEVICE, METHOD FOR MANUFACTURING THE SAME, AND ELECTRONIC APPARATUS

(75) Inventors: Chihiro Tanaka, Matsumoto (JP); Tadashi Tsuyuki, Shimosawa-machi (JP); Hideki Kaneko, Shiojiri (JP)

(73) Assignee: Seiko Epson Corporation, (JP)

( * ) Notice: Subject to any disclaimer, the term of this patent is extended or adjusted under 35 U.S.C. 154(b) by 0 days.

(21) Appl. No.: 10/123,013

(22) Filed: Apr. 15, 2002

(65) Prior Publication Data
US 2002/0171798 A1    Nov. 21, 2002

(30) Foreign Application Priority Data
Apr. 16, 2001 (JP) .............................. 2001-117464
Apr. 2, 2002 (JP) .............................. 2002-100571

(51) Int. Cl.[7] ......................................... G02F 1/1343
(52) U.S. Cl. .......................... 349/147; 349/50; 349/51; 349/139; 349/148
(58) Field of Search .......................... 349/50, 51, 139, 349/141, 143, 144, 147, 148

(56) References Cited

U.S. PATENT DOCUMENTS

| 4,861,141 | A | * | 8/1989 | Nakazawa | 349/51 |
|---|---|---|---|---|---|
| 5,042,917 | A | * | 8/1991 | Fujita et al. | 349/50 |
| 5,187,604 | A | * | 2/1993 | Taniguchi et al. | 349/152 |
| 5,442,469 | A | * | 8/1995 | Pitt | 349/51 |
| 5,581,382 | A | | 12/1996 | Kim | |
| 5,739,880 | A | | 4/1998 | Suzuki et al. | |
| 5,748,179 | A | * | 5/1998 | Ito et al. | 349/152 |
| 5,914,763 | A | | 6/1999 | Fujii et al. | |
| 6,049,365 | A | | 4/2000 | Nakashima | |
| 6,064,460 | A | * | 5/2000 | Ohta et al. | 349/141 |
| 6,323,930 | B1 | * | 11/2001 | Higuchi et al. | 349/152 |
| 6,373,000 | B2 | * | 4/2002 | Nakamura et al. | 174/264 |
| 6,392,735 | B1 | * | 5/2002 | Tani | 349/156 |
| 6,473,147 | B1 | | 10/2002 | Nakahara et al. | |

FOREIGN PATENT DOCUMENTS

| CN | 1276622 A | 12/2000 |
|---|---|---|
| EP | 0 967 512 | 12/1999 |

(Continued)

OTHER PUBLICATIONS

European Search Report from corresponding Application No. 02252665.1.

(Continued)

*Primary Examiner*—Dung T. Nguyen
*Assistant Examiner*—Michael H. Caley
(74) *Attorney, Agent, or Firm*—Harness, Dickey & Pierce, P.L.C.

(57) ABSTRACT

An electrooptic device has a first substrate 10 and a second substrate 20 disposed to oppose each other, and liquid crystal 35 provided between the first substrate 10 and the second substrate 20. This electrooptic device has a sealing material 30 surrounding the liquid crystal 35 and wires 16 continuously extending along one side of the first substrate 10 to another side intersecting said one side. The wires 16 each have a first wire layer which is continuously formed in the inside region of the sealing material 30 and the outside region of the sealing material 30 or which is continuously formed in the region overlapping the sealing material 30 and the outside region of the sealing material 30; and a second wire layer 182 which is formed in the inside region of the sealing material 30 or the region overlapping the sealing material 30. Since being not exposed to outside air, the second wire layer 182 is not corroded.

16 Claims, 21 Drawing Sheets

FOREIGN PATENT DOCUMENTS

| | | |
|---|---|---|
| EP | 1 041 641 A2 | 3/2000 |
| JP | 57-101883 | 6/1982 |
| JP | 63-25686 | 2/1988 |
| JP | 2-35419 | 2/1990 |
| JP | 3-064737 | 3/1991 |
| JP | 5-181154 | 7/1993 |
| JP | 9-143680 | 6/1997 |
| JP | 9-281516 | 10/1997 |
| JP | 9-311341 | 12/1997 |
| JP | 10-339880 | 12/1998 |
| JP | 11-288001 | 10/1999 |
| JP | 2000-221537 | 8/2000 |
| JP | 2001-75118 | 3/2001 |
| WO | WO 9812597 A1 * | 3/1998 ......... G02F 1/1345 |
| WO | WO99/52011 | 10/1999 |

OTHER PUBLICATIONS

Communication from Japanese Patent Office regarding counterpart application.

Communication from Chinese Patent Office re: counterpart Application.

Communication from Korean Patent Office regarding counterpart application.

* cited by examiner

FIG. 2
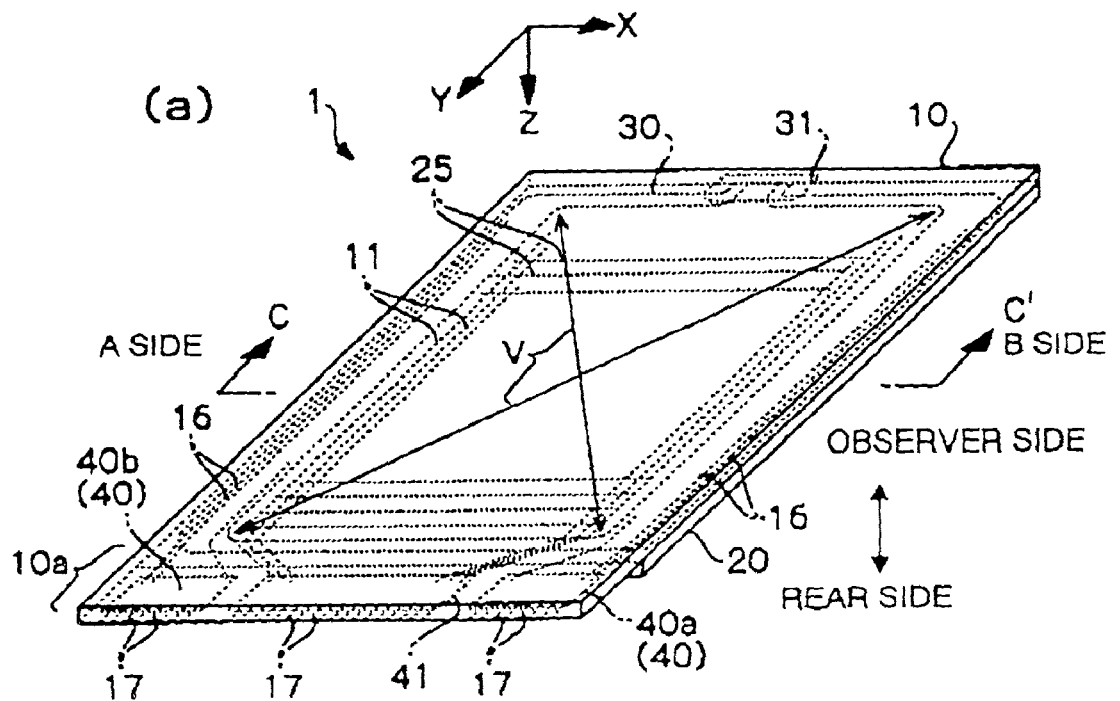
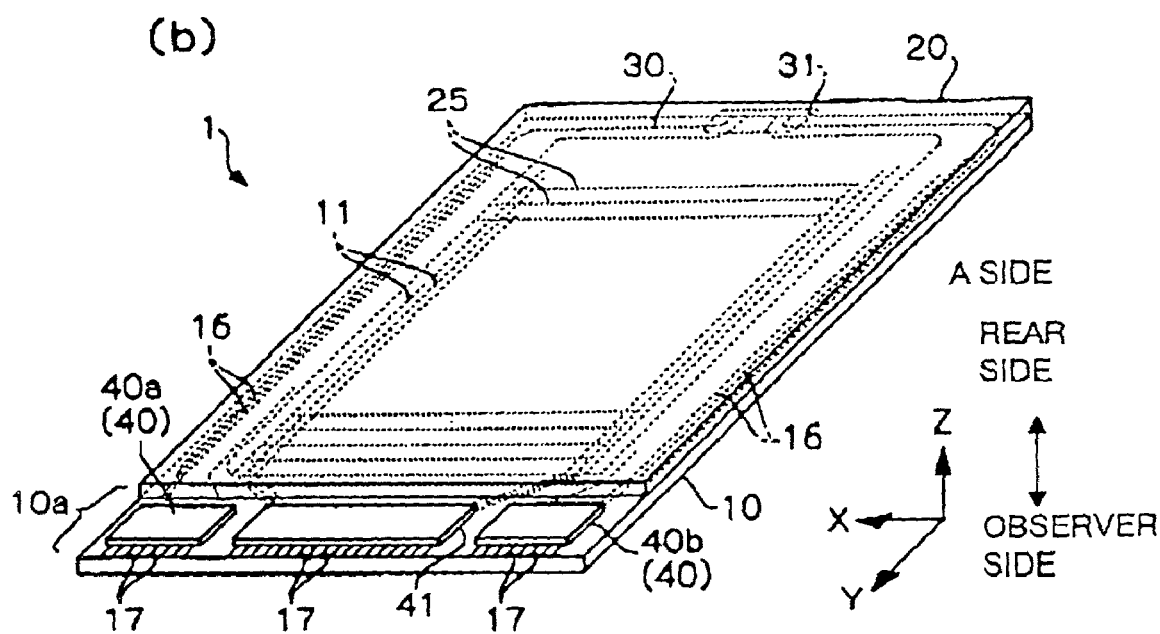

FIG. 9
DISPLAY REGION V FORMING REGION
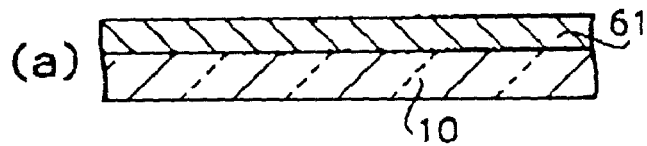
(a)
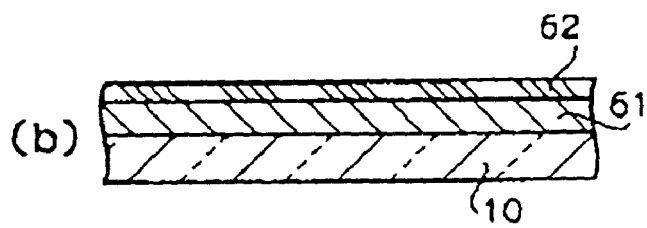
(b)
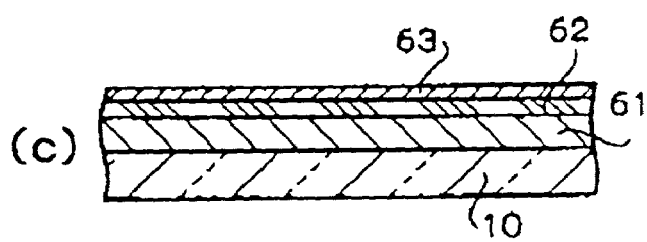
(c)
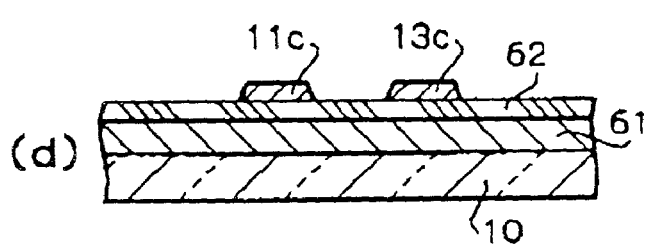
(d)
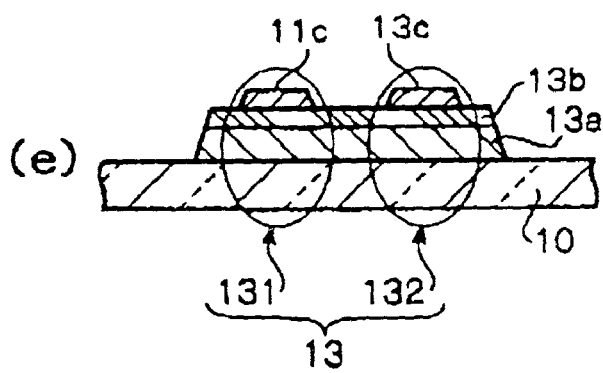
(e)
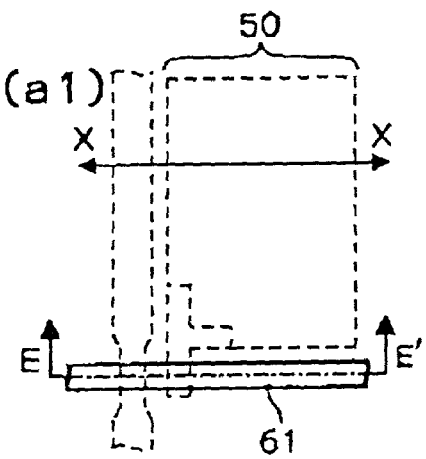
(a1)
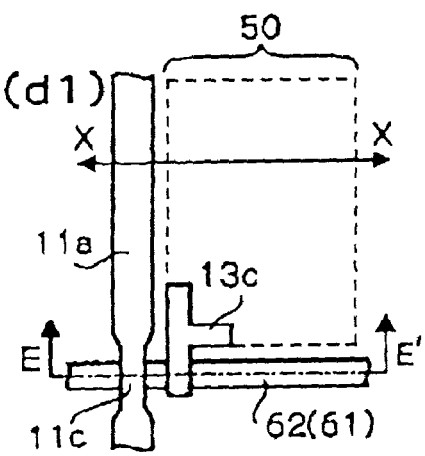
(d1)
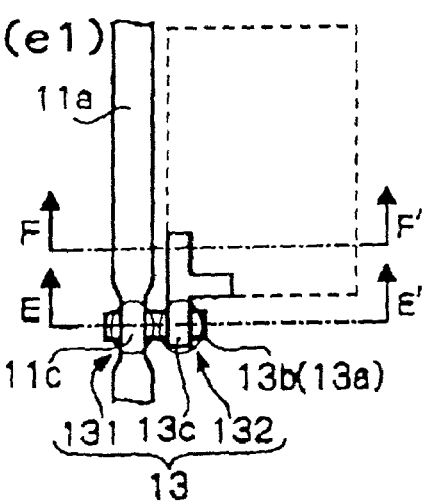
(e1)

FIG. 10
DISPLAY REGION V FORMING REGION
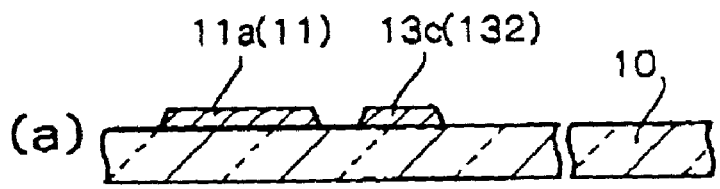
(a)
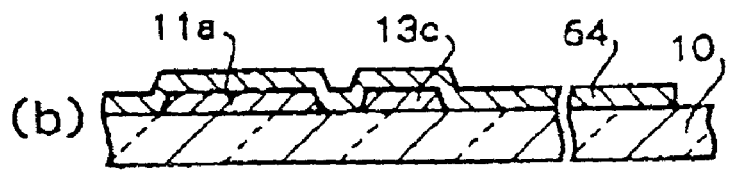
(b)
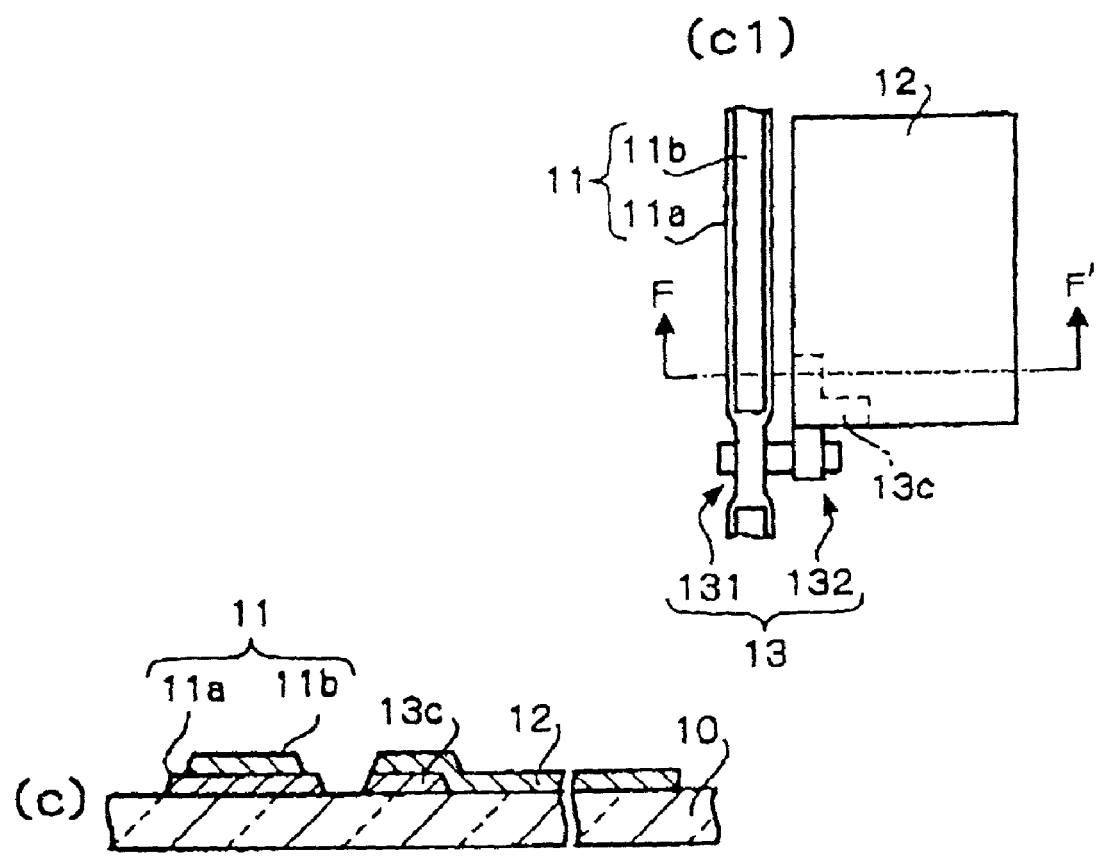
CROSS-SECTION ALONG F-F' IN FIG. C1

FIG. 16
(a)
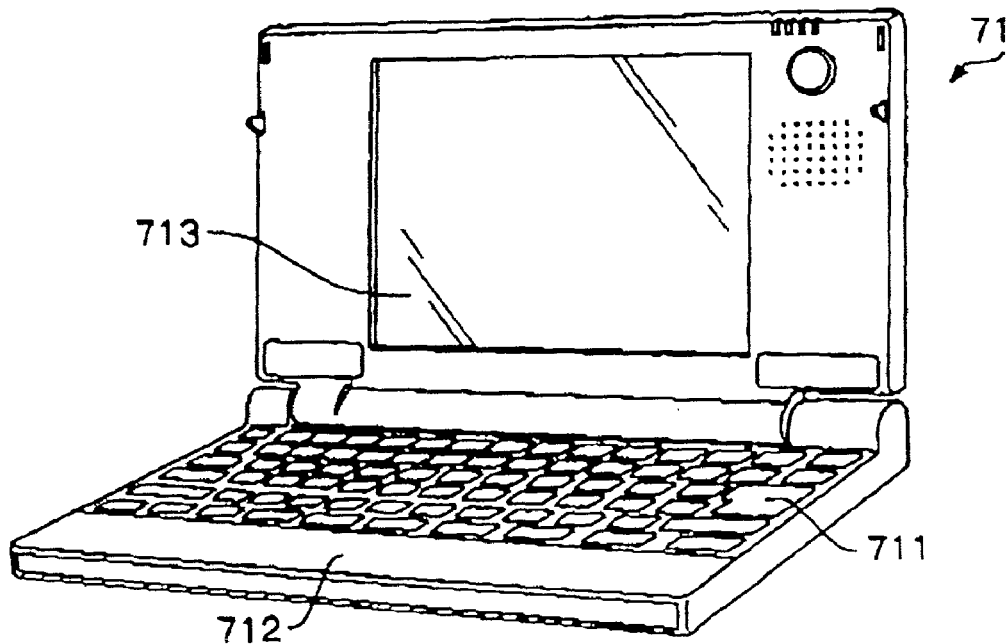
(b)
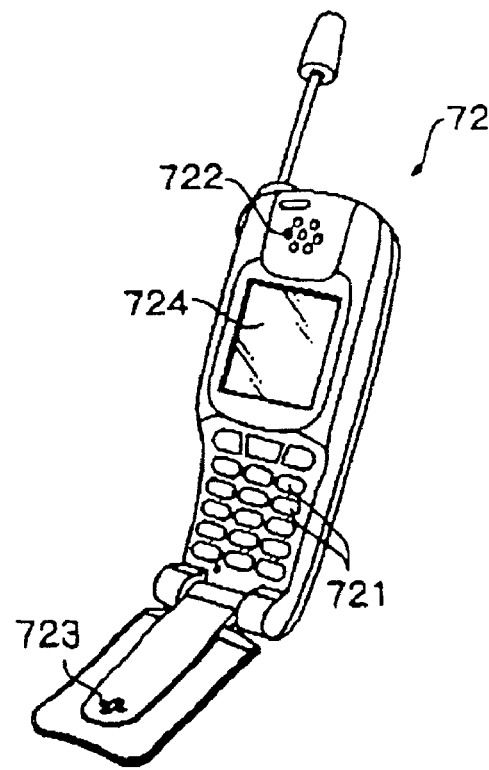

ELECTROOPTIC DEVICE, METHOD FOR MANUFACTURING THE SAME, AND ELECTRONIC APPARATUS

BACKGROUND OF THE INVENTION

1. Technical Field of the Invention

The present invention relates to electrooptic devices, such as a liquid crystal device, an EL (Electro Luminescent) device, and an electrophoretic device, to methods for manufacturing the electrooptic devices, and to electronic apparatuses provided with these electrooptic devices.

2. Description of the Related Art

In recent years, in electronic apparatuses such as mobile phones, portable information terminal apparatuses, and personal computers, liquid crystal devices have been widely used as, for example, a display portion for displaying information. In addition, it has been considered that an EL device will also be used in the future.

The liquid crystal device described above generally comprises a pair of substrates bonded together with a sealing material provided therebetween, liquid crystal enclosed between the substrates, and electrodes applying a voltage to the liquid crystal. In addition, the structure has been widely known in which wires are formed on a region of one substrate protruding from the other substrate (that is, a protruding region), terminals of various surface-mount components are connected to ends of the wires, and a voltage is applied to the electrodes described above.

In this structure, as the surface-mount components, for example, IC chips mounted on the protruding region by using a COG technique (Chip On Glass), or an FPC for connecting an external apparatus such as a circuit substrate to a liquid crystal device may be mentioned.

However, since wires formed on the protruding region are exposed to outside air, moisture or the like in the outside air is likely to adhere to the wires, and hence, the wires are liable to corrode. In addition, when corrosion of the wires occurs as described above, the conduction between the wires and the surface-mount components described above becomes insufficient, and as a result, a problem may arise in that the reliability as the liquid crystal device is degraded.

On the other hand, when decrease in wiring resistance of the wires is considered, the wires are preferably formed of a low resistance metal such as aluminum or chromium; however, since these metals have high ionicity and are susceptible to corrosion, the problem described above becomes more significant.

In consideration of the problem described above, the present invention was made, and an object thereof is to suppress the corrosion of the wires formed on the substrate.

SUMMARY OF THE INVENTION

To these ends, an electrooptic device of the present invention comprises:
(a) a first substrate; a second substrate disposed to oppose the first substrate;
liquid crystal provided between the first substrate and the second substrate;
(b) a sealing material enclosing the liquid crystal; and
(c) wires continuously extending along one side of the first substrate to another side intersecting said one side;
(d) wherein the wires each comprises:
  (i) a first wire layer which is formed continuously in the inside region and the outside region of the sealing material or which is formed continuously in the region overlapping the sealing material and the outside region thereof; and
  (ii) a second wire layer which is formed in the inside region of the sealing material or in the region overlapping the sealing material.

The electrooptic device having the structure described above must be a liquid crystal device since one of the constituent elements is the liquid crystal. According to this electrooptic device, since the second wire layer is not provided in the outside region of the sealing material, adhesion of moisture or the like contained in outside air to the second wire layer can be avoided. Accordingly, although formed of a conductive material having an inferior corrosion resistance, that is, a conductive material having high ionicity, the second wire layer can be prevented from being corroded.

In the electrooptic device described above, in addition to the region of the first substrate overlapping the sealing material, the second wire layer may be formed in the inside region of the sealing material, that is, the region opposing the liquid crystal. In this case, since adhesion of moisture or the like contained in outside air to the second wire layer can be avoided, although formed of a conductive material having inferior corrosion resistance, that is, a conductive material having high ionicity, the second wire layer can be prevented from being corroded.

(2) In the electrooptic device having the structure described above, one end of each of the wires provided in the outside region of the sealing material may be connected to an external connection circuit. In this case, as the external connection circuit, a driver IC, a TAB (Tape Automated Bonding) substrate provided with a driver IC, or an FPC (Flexible Printed Circuit) connected to a driver IC may be mentioned by way of example. According to this structure, output from the external connection circuit may be supplied to the electrooptic device via the wires.

(3) The electrooptic device having the structure described above may further comprise electrodes provided on the second substrate, and in this case, the electrodes may be electrically connected to the wires on the first substrate. According to this structure, various signals, such as data signals or scanning line signals, can be supplied to the electrodes via the wires.

(4) Next, another electrooptic device of the present invention comprises a first substrate; and wires continuously extending along one side of the first substrate to another side intersecting said one side; wherein the wires each comprises: a first wire layer formed on the first substrate; a second wire layer provided on part of the first wire layer; and a covering layer covering the second wire layer.

In the electrooptic device having the structure described above, the liquid crystal, the second substrate, and the sealing material are not always necessary as the constituent elements. As the electrooptic device described above, in addition to the liquid crystal device comprising the liquid crystal, the second substrate, and the sealing material, an EL device without being provided with the liquid crystal, the second substrate, and the sealing material may also be mentioned by way of example.

According to the electrooptic device having the structure described above, since the second wire layer, which is covered with the covering layer, is not exposed to the outside, adhesion of moisture or the like contained in outside air to the second wire layer can be avoided. Accordingly, although formed of a conductive material having inferior corrosion resistance, that is, a conductive material having high ionicity, the second wire layer can be prevented from being corroded.

(5) The electrooptic device having the structure described above may further comprise a plurality of thin-film diodes each formed of a first metal film, an insulating film, and a second metal film laminated to each other in that order on the first substrate. In this case, the first wire layer may be formed of the same layer as that for the first metal layer. As described above, when a part of the wire is formed by using one of the steps of forming a plurality of constituent elements forming the thin-film diodes, compared to the case in which the wires are formed by the steps exclusively used therefore, the manufacturing process can be simplified and the manufacturing cost can be reduced.

(6) According to the electrooptic device having the structure described above, after the first wire layer is formed of the same layer as that for the first metal film of the thin-film diode, the second wire layer may be formed of the same layer as that for the second metal film of the thin-film diode. As described above, when a part of the wire is formed by using one of the steps of forming a plurality of constituent elements forming the thin-film diodes, compared to the case in which the wires are formed by the steps exclusively used therefore, the manufacturing process can be simplified and the manufacturing cost can be reduced.

(7) The electrooptic device having the structure described above may further comprise a plurality of thin-film diodes each formed of a first metal film, an insulating film, and a second metal film laminated to each other in that order on the first substrate. In this case, only the second wire layer may be formed of the same layer as that for the second metal layer of the thin-film diode. As described above, when a part of the wire is formed by using one of the steps of forming a plurality of constituent elements forming the thin-film diodes, compared to the case in which the wires are formed by the steps exclusively used therefore, the manufacturing process can be simplified and the manufacturing cost can be reduced.

(8) The electrooptic device having the structure described above may further comprise a plurality of thin-film diodes each formed of a first metal film, an insulating film, and a second metal film laminated to each other in that order on the first substrate; and pixel electrodes each connected to the second metal film of each thin-film diode. In this case, the wires may further comprise third wire layers which are each continuously formed on the first wire layer in the inside region and the outside region of the sealing material or which are each continuously formed on the first wire layer in the region overlapping the sealing material and the outside region thereof; and this third wire layers may be formed of the same layer as that for the pixel electrodes.

As described above, when a part of the wire is formed by using one of the steps of forming pixel electrodes, compared to the case in which the wires are formed by the steps exclusively used therefore, the manufacturing process can be simplified and the manufacturing cost can be reduced.

(9) The electrooptic device having the structure described above may further comprise second wires formed on the second substrate, and the wires on the first substrate may be electrically connected to the second wires on the second substrate.

When the wires are formed as described above, for example, it is not necessary to mount components, which are to be electrically connected to the wires on the second substrate, such as a driver IC or an FPC, on the second substrate. That is, the components may only be mounted on the surface of one of the pair of substrates, and hence, the manufacturing process can be simplified and the manufacturing cost can be reduced.

(10) In the electrooptic device having the structure in which the wires on the first substrate are electrically connected to the wires on the second substrate, the wires on the first substrate and the wires on the second substrate are preferably electrically connected to each other via conductive particles dispersed in the sealing material. In this case, since the wires on both substrates are connected to each other by bonding the two substrates with the sealing material provided therebetween, a specific structure for electrically connecting the wires on both substrates to each other is not necessary; hence, the structure can be simplified, and in addition, the manufacturing cost can also be reduced.

(11) In the electrooptic device having the structure described above, the second wire layer forming the wire on the first substrate preferably has high ionicity than that of the other wire layers forming the wire. In other words, the first wire layer or the third wire layer preferably has ionicity lower than that of the second wire layer.

According to the electrooptic device of the present invention, since corrosion of the second wire layer can be suppressed, as described above, when the first wire layer or the third wire layer, which extends to the outside region of the sealing material, is formed of a material having low ionicity, corrosion of a part of the wire exposed to the outside region of the sealing material can be suppressed.

(12) In the electrooptic device having the structure described above, the second wire layer forming the wire on the first substrate preferably has a lower resistance than that of the other wire layers forming the wire. In general, a low-resistance metal such as chromium or aluminum has high ionicity and is liable to corrode in many cases. When the second wire layer is formed of the metal as mentioned above, corrosion of the wire is effectively suppressed, and in addition, the wiring resistance can also be reduced.

(13) In the electrooptic device having the structure described above, the width of a part of the wire on the first substrate, provided in the outside region of the sealing material, is preferably larger than that of a part of the wire provided in the region overlapping the sealing material. In other words, the width of a part of the wire having no second wire layer, that is, the width of a part of the wire formed of the first wire layer or of the first wire layer and the third wire layer is preferably larger than that of a part of the wire including the second wire layer. Since the part of the wire having no second wire layer is formed of the first wire layer or the third wire layer, which has a resistance higher than that of the second wire layer, the wiring resistance in this part of the wire may be increased in some cases. However, when the width of the part described above is formed larger, an increase in wiring resistance can be suppressed.

(14) Next, an electronic apparatus of the present invention comprises an electrooptic device having the structure described above. As described above, according to the electrooptic device having the structure described above, corrosion of the wire can be suppressed; hence, by the electronic apparatus comprising the electrooptic device described above, conduction defects or the like can be avoided, and high reliability can be realized.

(15) In a method for manufacturing an electrooptic device of the present invention, the electrooptic device has a first substrate, a second substrate bonded to the first substrate with a sealing material provided therebetween, liquid crystal provided between the first and the second substrate, and wires continuously formed on the first substrate in the region overlapping the sealing material and the outside region thereof. The method for manufacturing the electrooptic device described above comprises a first wire layer forming step of forming first wire layers, which constitute the wires, continuously on the first substrate in the region overlapping the sealing material and the outside region thereof; a second wire layer forming step of forming second wire layers, which constitute the wires, in the region overlapping the sealing material of the first substrate; and a bonding step of bonding the first substrate to the second substrate with the sealing material provided therebetween.

According to the method for manufacturing the electrooptic device, described above, since the second wire layers are not formed in the outside region of the sealing material, adhesion of moisture or the like contained in outside air to this second wire layers can be avoided; hence, even when formed of a conductive material having an inferior corrosion resistance, that is, a conductive material having high ionicity, the second wire layers can be prevented from being corroded.

(16) The method for manufacturing the electrooptic device described above may further comprise a step of forming first metal films; a step of forming insulating films on the first metal films; and a step of forming second metal films on the insulating films so as to form a plurality of thin-film diodes. In this method described above, in the first wire layer forming step, the first wire layers may be formed by the same layer as that for the first metal films of the thin-film diodes at the same time as the first metal films are formed. In addition, in the second wire layer forming step, the second wire layers may be formed by the same layer as that for the second metal films of the thin-film diodes at the same time as the second metal films are formed.

According to the method described above, compared to the case in which the thin-film diodes and the wires are formed independently of each other by different steps, the manufacturing cost can be reduced and the manufacturing steps can be simplified.

(17) The method for manufacturing the electrooptic device described above may further comprise a step of forming pixel electrodes, which are provided on the first substrate and which are connected to the second metal films of the thin-film diodes; and a third wire layer forming step of, prior to the bonding step, forming third wire layers, which form the wires, in the region overlapping the sealing material and the outside region thereof of the first substrate. In the method described above, the third wire layers are preferably formed by the same layer as that for the pixel electrodes at the same time as the pixel electrodes are formed. According to the method described above, the manufacturing cost can be further reduced.

BRIEF DESCRIPTION OF THE DRAWINGS

FIG. 2 includes views showing a liquid crystal device which is an example of an electrooptic device of an embodiment according to the present invention, FIG. 2(a) is a perspective view of the liquid crystal device when viewed from the observer side, and FIG. 2(b) is a perspective view of the liquid crystal when viewed from the rear side.

FIG. 9 includes views for illustrating a method for manufacturing an electrooptic device, according to an embodiment of the present invention, in which a method for manufacturing a TFD element is sequentially shown by steps.

FIG. 10 includes views for showing steps relating to the steps shown in FIG. 9.

FIG. 16 includes views showing electronic apparatuses of embodiments according to the present invention, FIG. 16(a) is a perspective view of a personal computer which is one example of an electronic apparatus, and FIG. 16(b) is a perspective view of a mobile phone which is another example of an electronic apparatus.

DETAILED DESCRIPTION OF THE PREFERRED EMBODIMENTS (First Embodiment of Electrooptic Device)

Hereinafter, an embodiment of the present invention will be described with reference to the case in which the present invention is applied to a liquid crystal device which is an active matrix type provided with TFD (Thin Film Diode)

elements as a switching element, uses liquid crystal as an electrooptic material, and is a reflective type using external light such as sunlight or indoor light.

Figure 1:
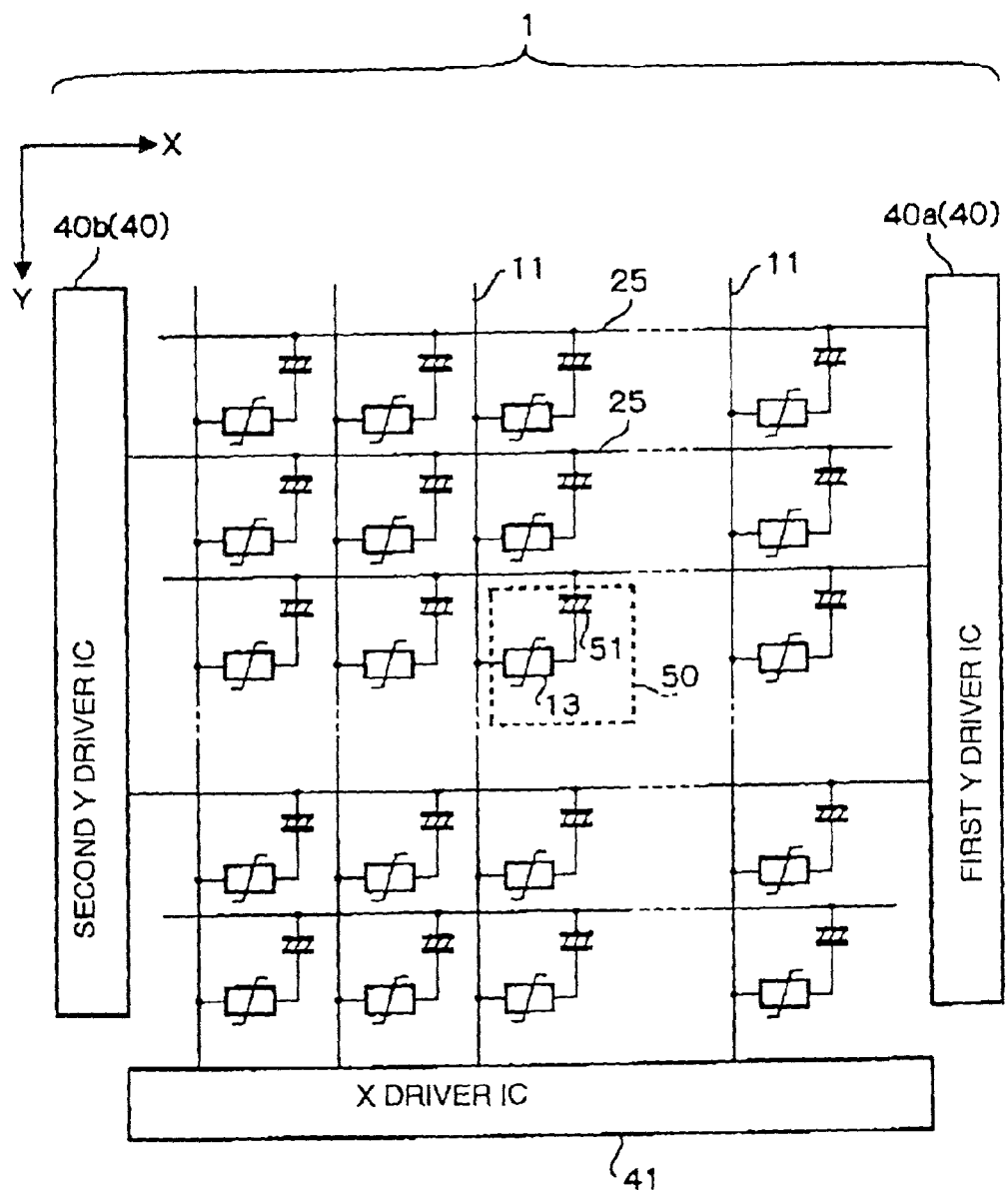
FIG. 1 shows an equivalent circuit diagram of an electrical structure of an active matrix liquid crystal device particularly using TFD elements, the liquid crystal device being an example of an electrooptic device according to the present invention.

FIG. 1 is a block diagram showing the electrical structure of the liquid crystal device of this embodiment. As shown in this figure, a liquid crystal device 1 comprises a plurality of scanning lines 25 extending in the X direction, a plurality of data lines 11 extending in the Y direction perpendicular to the X direction, a plurality of display dots 50 provided at the intersections between the scanning lines 25 and the data lines 11. Each display dot 50 has the structure in which a liquid crystal display element 51 and a TFD element 13 are connected to each other in series. These display dots 50 are disposed in a matrix.

One display dot 50 is a minimum unit of display element for displaying an image, and when the image is a color image formed by combination of the three primary colors R (red), G (green), and B (blue), these three display dots 50 of R, G, and B forms one pixel. On the other hand, when the image is a monochrome image, one pixel is formed by one display dot 50.

In FIG. 1, among the plurality of scanning lines 25, the scanning lines 25 in odd positions from the top are connected to a first Y driver IC 40a. On the other hand, the scanning lines 25 in even positions from the top are connected to a second Y driver IC 40b. Subsequently, scanning signals generated by these Y driver IC's 40a and 40b are supplied to the scanning lines 25. In the case in which it is not necessary to discriminate between the first Y driver IC 40a and the second Y driver IC 40b, hereinafter, they are simply referred to as a Y driver IC 40.

The plurality of data lines 11 are connected to an X driver IC 41, and data signals generated by this X driver IC 41 are supplied to the data lines 11. In addition, each of the plurality of display dots 50 disposed in a matrix corresponds to one color of R, G, and B in this embodiment.

Next, FIG. 2(a) shows the case in which the liquid crystal device 1 of this embodiment is viewed from the observer side, that is, the position at which the observer is to be positioned. FIG. 2(b) shows the case in which this liquid crystal device 1 is viewed from the rear side thereof, that is, the position opposite to the case in FIG. 2(a). Hereinafter, as shown in FIGS. 2(a) and 2(b), the negative direction and the positive direction of the X-axis are referred to as "A side" and "B side", respectively.

As shown in FIGS. 2(a) and 2(b), the liquid crystal device 1 has the structure in which an element substrate 10 and a counter substrate 20 opposing each other are bonded together with a sealing material 30, and in the region formed by both substrates and the sealing material 30, liquid crystal (not shown in FIG. 2) is enclosed. The sealing material 30 is formed into an approximately rectangular frame along the edge portions, that is, the periphery, of the counter substrate 20. In a part of the sealing material 30, an aperture is formed for injecting liquid crystal. After the liquid crystal is injected via the aperture, this aperture is sealed with a plugging material 31.

In the sealing material 30, a number of conductive particles having conductivity are dispersed. These conductive particles are, for example, plastic particles plated with metal or conductive resin particles, and serve to electrically connect the wires formed on the element substrate 10 to those formed on the counter substrate 20 and also serve as spacers which maintain the space between the substrates, that is, the cell gap. In practice, on each of the outside surfaces of the element substrate 10 and the counter substrate 20, a polarizer which polarizes incident light, a retardation film which compensates for interference light, and the like are provided; however, since these elements have not direct relation to the present invention, a graphic representation and description thereof are omitted.

The element substrate 10 and the counter substrate 20 are formed of a light transmissive member in the form of a plate, such as light transmissive glass, light transmissive quartz, or light transmissive plastic. Of these substrates, on the inside surface, that is, on the surface at the liquid crystal side, of the element substrate 10 located at the observer side, the plurality of data lines 11 described above is formed. On the other hand, on the inside surface of the counter substrate 20 located at the rear side, the plurality of scanning lines 25 is formed.

The element substrate 10 has a protruding region 10a protruding from the counter substrate 20, and this protruding region 10a is a region which protrudes outside from the periphery of the sealing material 30 and is a region which do not overlap the sealing material 30 and the liquid crystal enclosed in the inside region thereof. On an area in the vicinity of the central portion in the X direction of the protruding region 10a, the X driver IC 41 is mounted. In addition, on the positions opposing each other with the X driver IC 41 provided therebetween, the first Y driver IC 40a and the second Y driver IC 40b are mounted.

The driver IC's 41, 40a, and 40b described above are mounted on the protruding region 10a by using a COG technique. That is, these driver IC's are bonded to the protruding region 10a of the element substrate 10 by using ACF's (Anisotropic Conductive Film) formed of conductive particles dispersed in an adhesive (see FIG. 8(b)). In addition, on the edge portion of the protruding region 10a, a plurality of external connection terminals 17 is formed. To the area at which these external connection terminals 17 are formed, for example, one end of an FPC (Flexible Printed Circuit) (not shown) is connected, and to the other end of this FPC, for example, an external apparatus such as a circuit substrate is connected. Accordingly, electrical power, electrical signals, and the like output from the external apparatus are supplied to the external connection terminals 17 via the FPC.

The X driver IC 41 generates data signals in accordance with signals input from the external apparatus via the FPC and the external connection terminals 17 and outputs the data signals thus generated to the data lines 11. On the other hand, the Y driver IC 40 generates scanning signals in accordance with signals input from the external apparatus via the FPC and the external connection terminals 17 and outputs the scanning signals thus generated. These scanning signals are supplied to the individual scanning lines 25 on the counter substrate 20 from wires 16 formed on the element substrate 10 via the conductive particles in the sealing material 30.

Figure 3:
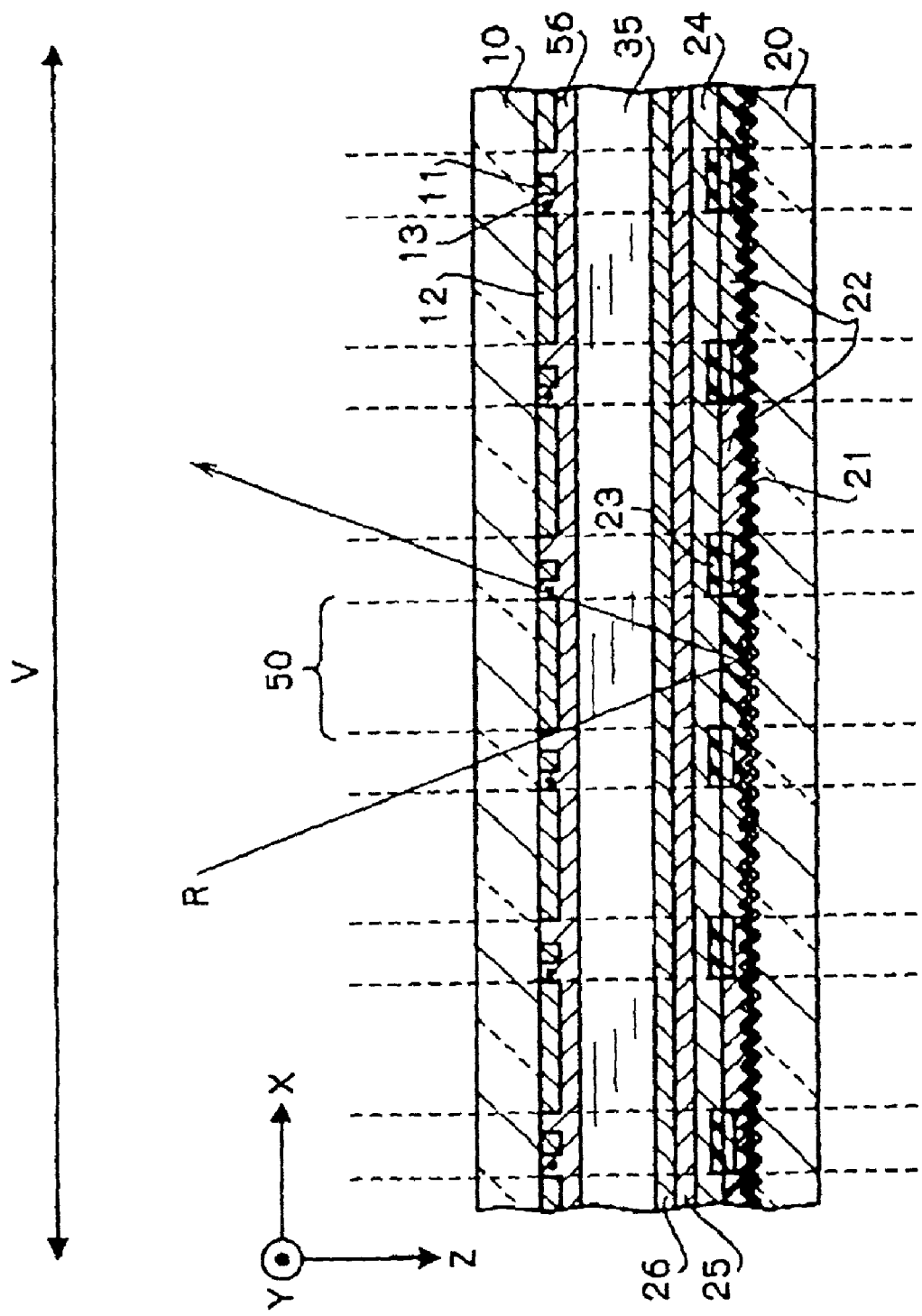
FIG. 3 is a cross-sectional view of the liquid crystal device taken along the line C–C' in FIG. 2(a).
Figure 4:
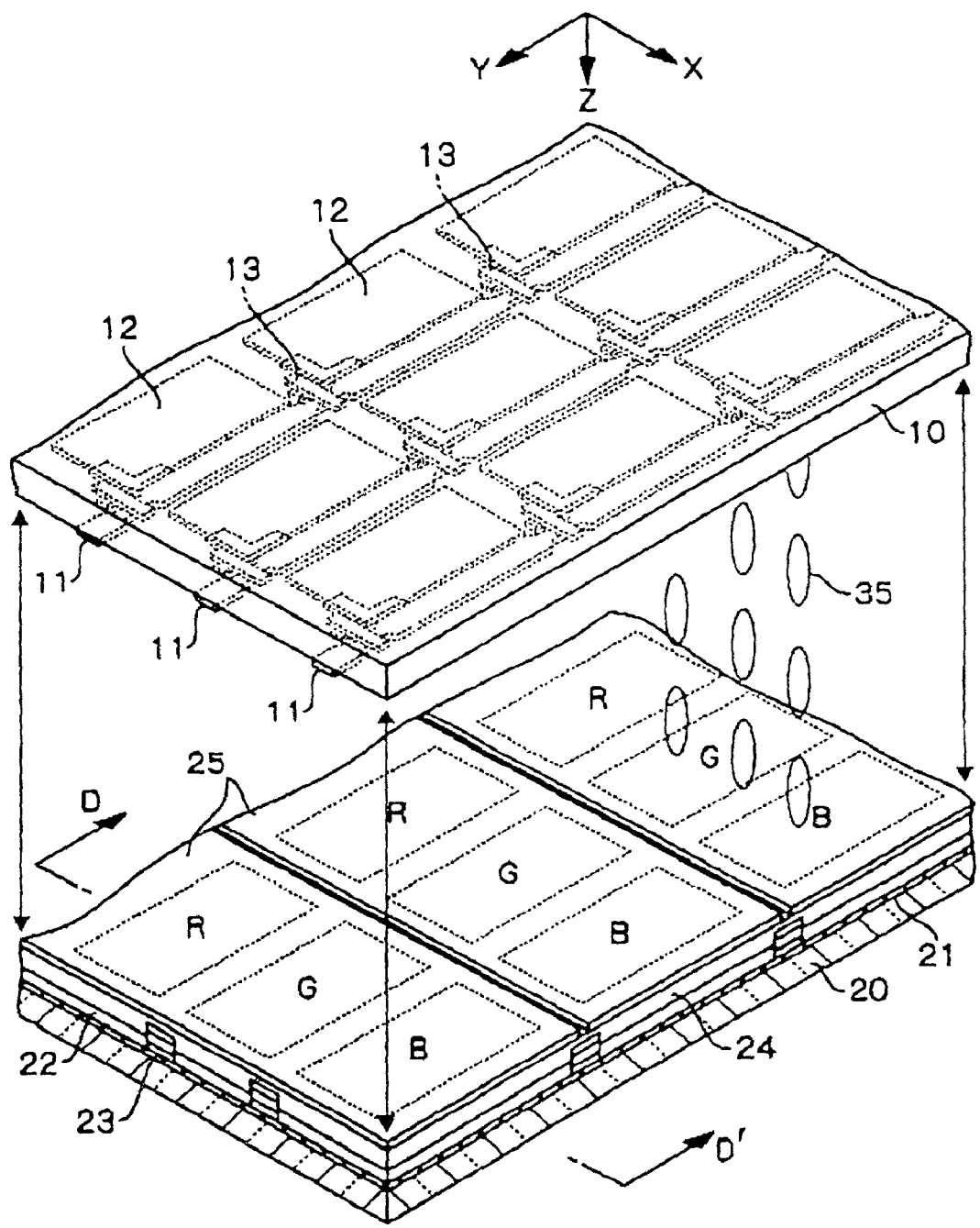
FIG. 4 is a perspective view showing the structure of a display region of the liquid crystal device shown in FIG. 2(a).

Next, the structure of an area surrounded by the inner periphery of the sealing material 30, that is, the structure of the display region V, will be described. FIG. 3 is a cross-sectional view showing a part of the display region V taken along the line C–C' in FIG. 2(a). In addition, FIG. 4 is a perspective view showing several display dots formed in the display region V. Related to this, a cross-sectional view taken along the line D–D' in FIG. 4 corresponds to FIG. 3.

As shown in these figures, on the inside surface of the element substrate 10 in the display region V, that is, on the surface at liquid crystal 35 side, a plurality of pixel electrodes 12 disposed in a matrix and the plurality of the data lines 11 extending in the Y direction at the spaces between the pixel electrodes 12 are formed. Each of the pixel electrodes 12 is an approximately rectangular electrode formed of a transparent conductive material such as ITO (Indium Tin Oxide). In addition, each of the pixel electrodes 12 and the data line 11 adjacent to the pixel electrode 12 at one side thereof are connected to each other via the TFD element 13.

In addition, as shown in FIG. 3, the surface of the element substrate 10 on which the data lines 11, pixel electrodes 12, and the TFD elements 13 are formed is covered with an alignment film 56 (not shown in FIG. 4). This alignment film 56 is an organic thin-film formed of a polyimide resin or the like, and this alignment film is processed by rubbing treatment so as to determine the orientation of the liquid crystal 35 when a voltage is not applied thereto.

Figure 5:
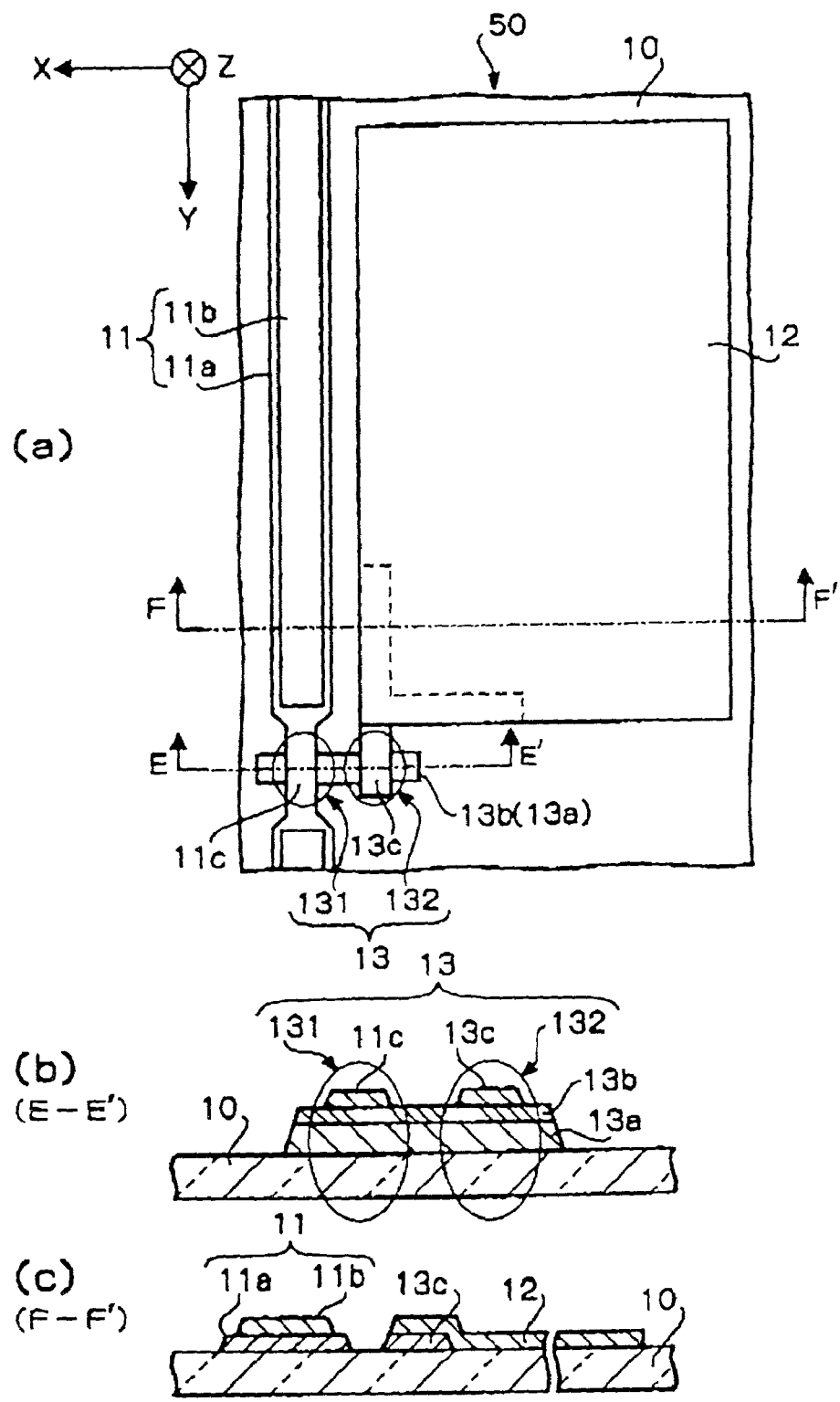
FIG. 5(a) is a plan view showing one pixel electrode and one TFD element shown in FIG. 4.
FIG. 5(b) is a cross-sectional view taken along the line E–E' in FIG. 5(a)
FIG. 5(c) is a cross-sectional view taken along the line F–F' in FIG. 5(a).

FIG. 5(a) shows the case in which one display dot 50 on the element substrate 10 is viewed from the counter substrate 20 side, that is, from the rear side opposite to the observer side. In addition, FIG. 5(b) is a cross-sectional view taken along the line E–E' in FIG. 5(a), and FIG. 5(c) is a cross-sectional view taken along the line F–F' in FIG. 5(a). As shown in FIGS. 5(a) and 5(c), the data line 11 is composed of a main wire 11a and a subwire 11b provided on the main wire 11a. The subwire 11b is a wire which serves as a data line 11 instead of the main wire 11a when, for example, the main wire 11a breaks, and the subwire 11b is formed of the same layer as that for the pixel electrode 12.

In addition, as shown in FIGS. 5(a) and 5(b), the TFD element 13 is formed of a first metal film 13a extending in the X direction and intersecting the main wire 11a of the data line 11, an insulating film 13b formed on the surface of this first metal film 13a by anodizing, and second metal films 11c and 13c formed apart from each other on the surface of this insulating film 13b.

The first metal film 13a is formed of one of various conductive materials, such as tantalum (Ta) and a tantalum alloy containing tungsten (W) or the like. However, in this embodiment, the first metal film 13a is formed of tantalum. In addition, as shown in FIG. 5(a), the second metal film 11c is located at the position at which the first metal film 13a intersects the main wire 11a forming the data line 11. The subwire 11b is laminated on the surface of the main wire 11a at which the second metal film 11c is not provided.

The second metal film 13c is connected to the pixel electrode 12. In addition, the main wire 11a (including the second metal film 11c) of the data line 11 and the second metal film 13c are formed of the same layer composed of one of various conductive materials such as chromium (Cr) and aluminum (Al). However, in this embodiment, the main wire 11a and the second metal wire 13c are formed of chromium.

TFD element 13 is composed of a first TFD element 131 and a second TFD element 132. That is, as shown in FIGS. 5(a) and 5(b), the first TFD element 131 has the structure in which the second metal film 11c, the insulating film 13b, and the first metal film 13a are laminated to each other in that order when viewed from the data line 11 side, and since a sandwich structure composed of a metal, an insulating body, and a metal is formed, the bidirectional diode switching property is obtained.

On the other hand, the second TFD element 132 has the structure in which the first metal film 13a, the insulating film 13b, and the second metal film 13c are laminated to each other in that order when viewed from the data line 11 side, and as a result, the second TFD element 132 has a diode switching property opposite to that of the first TFD element 131.

As described above, since the TFD element 13 is composed of the two diodes connected in series and electrically opposite to each other, compared to the case in which one diode is used, non-linear properties of the relationship between current and voltage in both positive and negative directions becomes symmetrical. However, in order to ensure this symmetrical non-linear property, the insulating film 13b of the first TFD element 131 and the insulating film 13b of the second TFD element 132 must have the same thickness, and in addition, the area of the first metal film 13a opposing the second metal film 11c of the first TFD element 131 must be the same as that of the first metal film 13a opposing the second metal film 13c of the second TFD element 132.

In this embodiment, in order to make the area described above of the first TFD element 131 equal to that of the second TFD element 132, as shown in FIG. 5(a), the width of a part of the main wire 11a, which forms the data line 11, at the position corresponding to the second metal film 11c is smaller than that of the other part of the main wine 11a.

In FIGS. 3 and 4, on the surface of the counter substrate 20, a reflector 21, color filters 22, a shading layer 23, an overcoat layer 24, the plurality of scanning lines 25, and an alignment film 26 are formed. The reflector 21 is a thin-film formed of a metal, such as aluminum or silver, having a light reflection property. In FIG. 3, light R incident on the liquid crystal device from the observer side is reflected from the surface of the reflector 21 and is then emitted to the observer side, and hence, so-called reflective display can be realized.

In these steps, as shown in FIG. 3, in an area of the inside surface of the counter substrate 20, which is to be covered with the reflector 21, an irregular surface having a number of fine concaves and convexes is formed. Accordingly, on the surface of the reflector 21 having a small thickness formed so as to cover this irregular surface, fine concaves and convexes are formed in accordance with this irregular surface. These concaves and convexes serve as the structure for scattering light. As a result, since the incident light from the observer side is reflected in an appropriately scattered state from the surface of the reflector 21, a wide viewing angle can be realized by avoiding mirror reflection from the surface of the reflector 21.

The color filter 22 is a resin layer formed on the surface of the reflector 21 so as to correspond to each display dot 50 and, as shown in FIG. 4, is colored one of R (red), G (green), and B (blue) by a dye or a pigment. In addition, three display dots 50 having different colors from each other form one pixel which creates a display image.

The shading layer 23 is formed in a lattice pattern on the element substrate 10 so as to correspond to the spaces formed between the pixel electrodes 12 arranged in a matrix, and serves to shade the spaces between the pixel electrodes 12. The shading layer 23 in this embodiment has the structure formed of three different color filters R, G, and B laminated to each other. The overcoat layer 24 is a layer for planarizing irregularity formed by the color filters 22 and the shading layer 23 and is formed of a resin material such as an epoxy or an acrylic resin.

The scanning lines 25 are each a strip-shaped electrode formed on the overcoat layer 24 by using a transparent conductive material such as ITO. As shown in FIG. 4, the scanning line 25 is formed extending in the X direction so as to oppose a plurality of the pixel electrodes 12 aligned in the X direction on the element substrate 10. In addition, the pixel electrode 12, the scanning line 25 opposing thereto, and the liquid crystal provided therebetween form the liquid crystal display element 51 shown in FIG. 1.

When a voltage not less than a threshold voltage is applied to the TFD element 13 by supplying a scanning signal to the scanning line 25 and supplying a data signal to the data line 11, the TFD element 13 is placed in an ON state. As a result, charges are stored in the liquid crystal 51 connected to the TFD element 13, and the orientation of the liquid crystal 35 is changed. By changing the orientation of the liquid crystal 35 in each display dot 50 as described above, a desired image can be displayed. In addition, after the charges are stored, when the TFD element 13 is placed in an OFF state, the charges stored in the liquid crystal display element 51 are maintained.

In FIG. 3, the surface of the overcoat layer 24 on which the plurality of scanning lines 25 are formed is covered with the alignment film 26. This alignment film 26 is formed of the same material as that used for forming the alignment film 56 on the element substrate 10 and is also be processed by rubbing treatment as is the alignment film 56.

Figure 6:
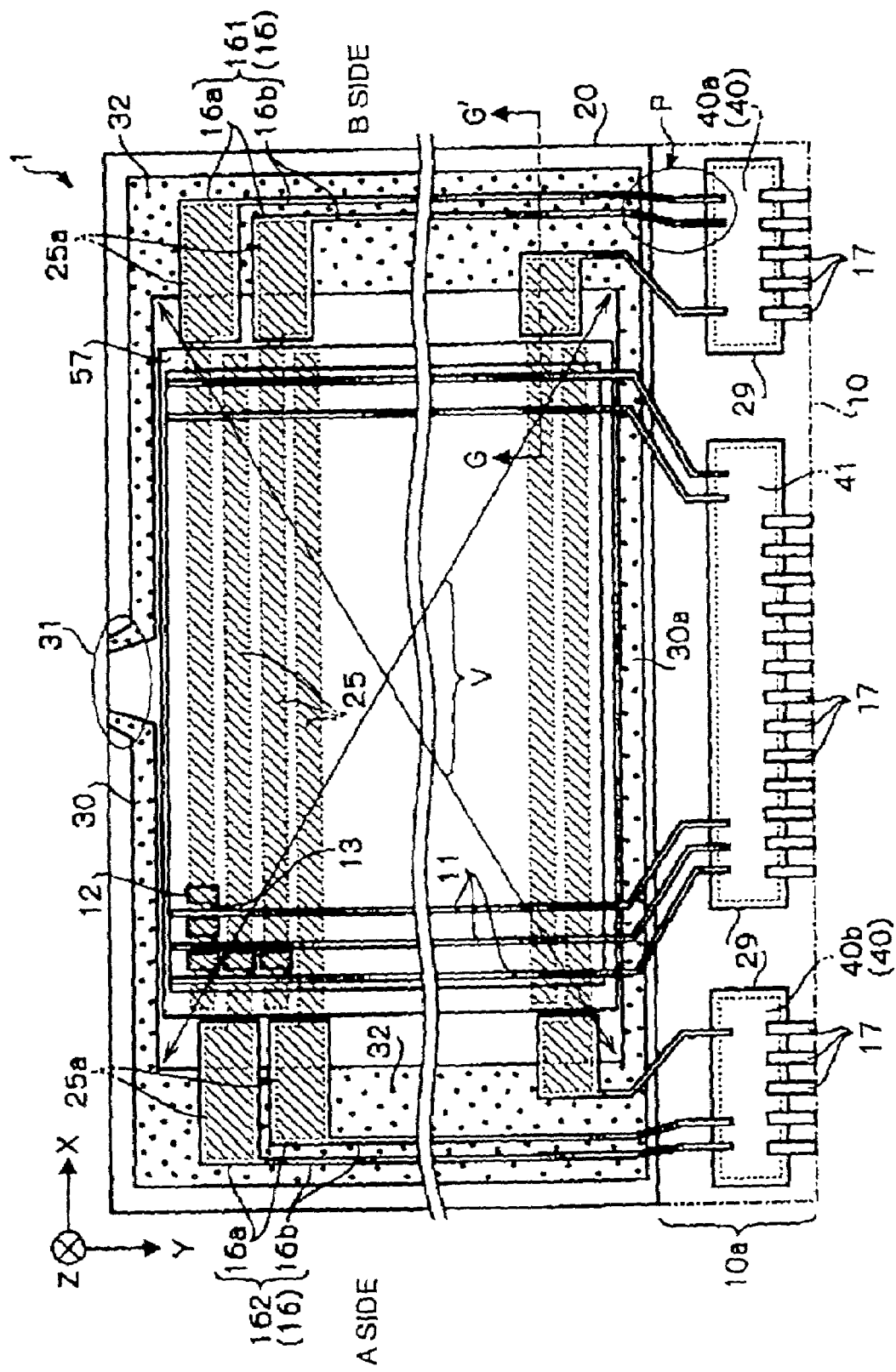
FIG. 6 is a plan, cross-sectional view of the liquid crystal device shown in FIG. 2(a).

Next, referring FIG. 6, the wire configuration of the liquid crystal device of the present invention will be described. FIG. 6 shows the planar structure of the liquid crystal device 1 when viewed from the observer side, that is, the element substrate 10 side, and also shows the state in which a substrate material forming the element substrate 10 is removed so that the data lines 11 formed on the substrate material can be seen. The direction from the front side to the rear side in FIG. 6 corresponds to the positive direction of the Z-axis shown in FIGS. 2(*a*) and 2(*b*). Accordingly, in FIG. 6, the element substrate 10 is located at the front side of the plane, and the other elements are located at the rear side of the plane with respect to the element substrate 10.

In FIG. 6, each data line 11 extends in the Y direction in the display region V and further extends past one side 30*a* of the sealing material 30 to the protruding region 10*a*. In addition, ends of the data lines 11 extending to the protruding region 10*a* are connected to the output terminals of the X driver IC 41 via the conductive particles contained in an ACF 29. According to this structure, data signals generated by the X driver IC 41 are output to the individual data lines 11.

Figure 7:
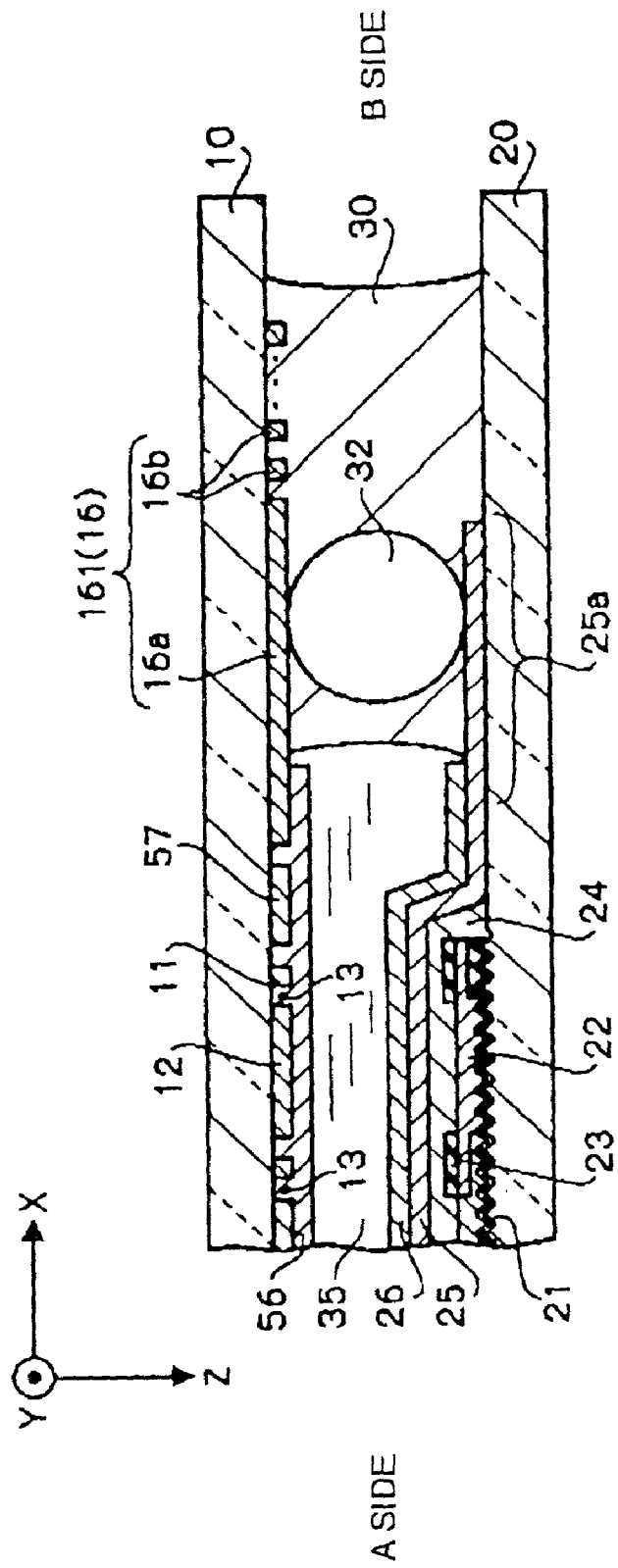
FIG. 7 is a cross-sectional view taken along the line G–G' in FIG. 6.

In FIG. 6, the scanning lines 25 (shown by oblique lines) provided on the counter substrate 20 in the X direction alternately extend to the A side and the B side, and the extending ends of the scanning lines 25 are disposed so as to overlap the sealing material 30. FIG. 7 is a cross-sectional view taken along the line G–G' in FIG. 6, that is, a cross-sectional view corresponding to a scanning line 25 disposed in an odd position. As shown in FIG. 7, in the vicinity of the area of the counter substrate 20 which is covered with the sealing material 30, the color filter 22, the overcoat layer 24, and the like are not formed. On the other hand, the scanning line 25 in the odd position is continuously provided on the surfaces of the overcoat layer 24 and the counter substrate 20 and further extends in the X direction to the B side of the sealing material 30, and the end of the scanning line 25 is finally covered with the sealing material 30. That is, the end of the scanning line 25 is provided between the counter substrate 20 and the sealing material 30.

In addition, in FIG. 6, the width of the end (hereinafter referred to as "conduction portion 25*a*") of the scanning line 25 covered with the sealing material 30 is large compared to the width thereof in the display region V. The same structure as that described above is formed for the scanning line 25 in an even position. As shown in FIG. 6, the scanning line 25 in an even position extends in the X direction to the A side of the sealing material 30 so that the conduction portion 25*a* located at the end of the scanning line 25 overlaps the side of the sealing material 30 at the A side. In addition, on the surface of the element substrate 10 at the liquid crystal side and in the vicinity of the inner periphery of the sealing material 30, a peripheral shading layer 57 in the form of a frame is formed along the edges of the display region V. This peripheral shading layer 57 is a layer for shading in the vicinity of the edge portions of the display region V.

In FIGS. 6 and 7, on the surface of the element substrate 10 at the liquid crystal side, a plurality of wires 16, which extend along two edge portions of the element substrate 10 in the Y direction toward the other side intersecting these two edge portions, is formed. Each wire 16 is a wire for connecting the scanning line 25 and the output terminal of the Y driver IC 40 to each other. In more particular, the wires 16 are, as shown in FIG. 6, composed of wires 161 formed along the edge portion at the B side of the element substrate 10 and wires 162 formed along the edge portion at the A side of the element substrate 10. These wires 16 each have a conduction portion 16*a* and an extension portion 16*b* extending along the edge portion of the element substrate 10.

The conduction portion 16*a* of the wire 16 is formed so as to oppose the conduction portion 25*a* of the scanning line 25. In addition, as shown in FIG. 7, the conduction portion 25*a* of the scanning line 25 in an odd position, formed on the counter substrate 20, is electrically connected to the conduction portion 16*a* of the wire 161 formed on the element substrate 10 via conductive particles 32 dispersed in the sealing material 30. The same structure is formed for the scanning line 25 in an even position, that is, the conduction portion 25*a* is electrically connected to the conduction portion 16*a* of the wire 162 formed on the element substrate 10 via conductive particles 32 dispersed in the sealing material 30 at the A side.

The extension portion 16*b* of the wire 16 is connected at one end thereof to the conduction portion 16*a* and extends past the region of the element substrate 10 covered with the sealing material 30, that is, the region overlapping the sealing material 30, to the protruding region 10*a*. In more particular, the extension portion 16*b* of the wire 161 on the element substrate 10 is covered with the side of the sealing material 30 located at the B side and extends approximately in the same direction as that of the side thereof at the B side toward an area of the protruding region 10*a* at the B side, that is, the area on which the first Y driver IC 40 is to be mounted. In addition, the end of the extension portion 16*b* extending to the protruding region 10*a* is connected to the output terminal of the first Y driver IC 40*a*.

On the other hand, the extension portion 16*b* of the wire 162 is covered with the sealing material 30 on the element substrate 10 at the A side and extends approximately in the same direction as that of the side thereof at the A side, and the end of the extension portion 16*b* extending to the protruding region 10*a* at the A side is connected to the output terminal of the second Y driver IC 40*b*. As described above, in this embodiment, the extension portion 16*b* of the wire 16 covered with the side of the sealing material 30 extends approximately in the same direction as that of the side mentioned above of the sealing material 30. In other words, the sealing material 30 is formed so that, among the sides of the sealing material 30, the side extending approximately in the same direction as that of a part of the wire 16 covers the part of the wire 16.

Accordingly, the widths of the two sides of the sealing material 30 extending in the Y direction, that is, the widths of the two sides to cover the wires 16, are large compared to the widths of the two sides extending in the X direction. That is, the widths of the two sides extending in the X direction should be large enough to bond the element substrate 10 and the counter substrate 20 to each other; however, the widths of the two sides extending in the Y direction are determined so that the wires 16 can be covered therewith and the two substrates can also be bonded to each other.

A scanning signal output from the first Y driver IC 40*a* is supplied to the conduction portion 25*a* of the scanning line 25 formed in an odd position on the counter substrate 20 via the conduction portion 16*a* and the extension portion 16*b* of the wire 161 and the conductive particles 32 dispersed in the sealing material 30 at the B side. In a manner similar to the above, the scanning signal output from the second Y driver IC 40*b* is supplied to the conduction portion 25*a* of the scanning line 25 formed in an even position via the wire 161 and the conductive particles 32 dispersed in the sealing material 30 at the A side.

As described above, in this embodiment, since the wires 16 have the portions thereof covered with the sealing material 30, corrosion caused by adhesion of moisture or the like to this portion can be avoided. In addition, in the portions described above, since the case in which moisture or conductive impurity adheres to a plurality of the wires 16 adjacent to each other may not occur, short-circuiting between the wires may not occur, and hence, the gaps between the wires 16 can be decreased. Consequently, an area in which the wires 16 are formed can be decreased.

Next, a layered structure of the wire 16 will be described. The wire 16 of this embodiment is formed of the same layers as those for the element in the display region V, such as the TFD element 13 and the pixel electrode 12. However, a part of the wire 16 located in the protruding region 10*a*, that is, the outside region of the sealing material 30, and a part of the wire 16 which is covered with the sealing material 30, that is, which is provided in the region overlapping the sealing material 30, have layered structures different from each other. The details will be described below.

Figure 8:
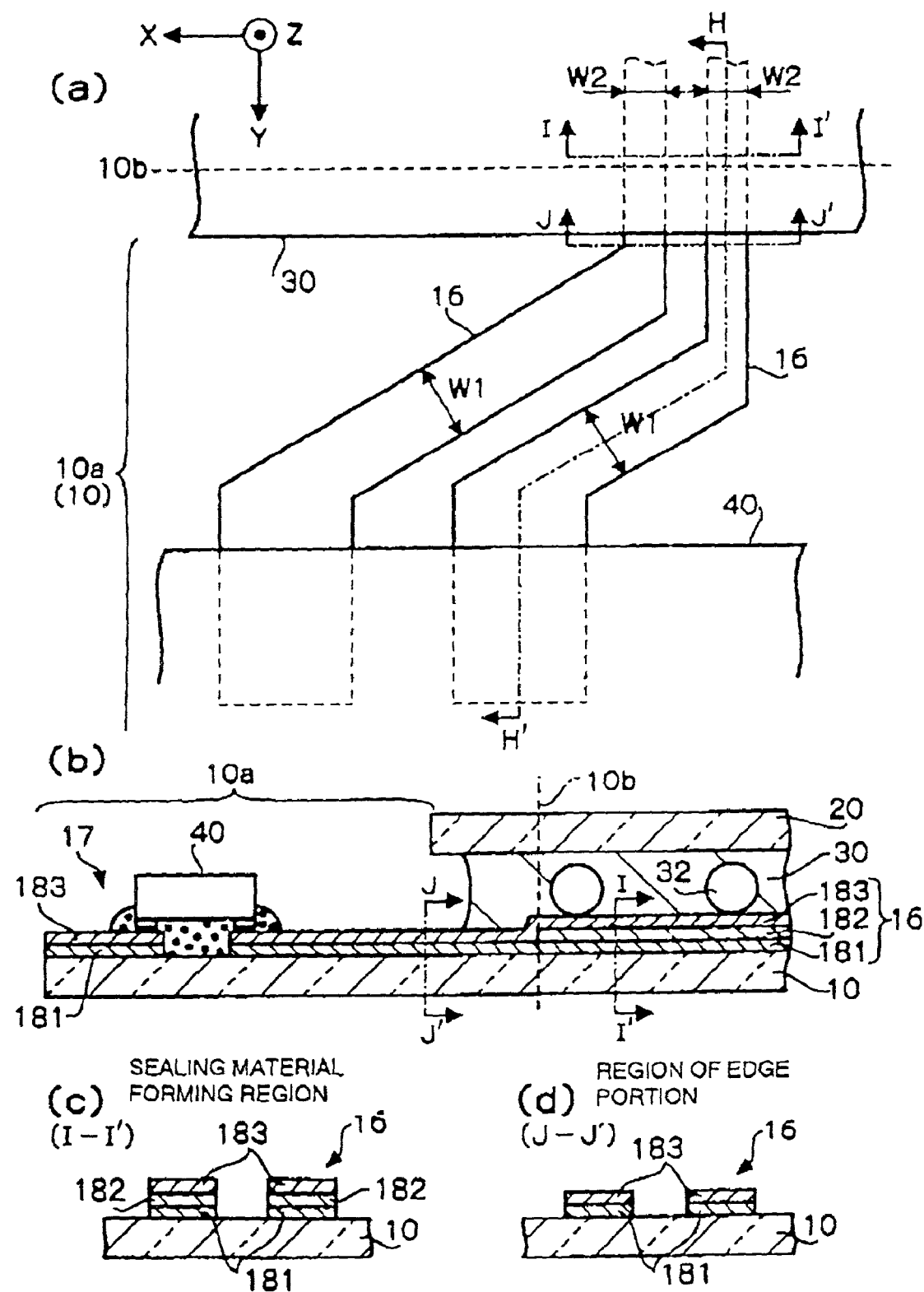
FIG. 8(a) is an enlarged plan view of a portion indicated by the arrow P in FIG. 6.
FIG. 8(b) is a cross-sectional view taken along the line H–H' in FIG. 8(a)
FIG. 8(c) is a cross-sectional view taken along the line I–I' in FIG. 8(a)
FIG. 8(d) is a cross-sectional view taken along the line J–J' in FIG. 8(a).

FIG. 8(*a*) is an enlarged view showing a portion indicated by the arrow P in FIG. 6, that is, portions of the wires 16 extending to the protruding region 10*a*. In addition, FIG. 8(*b*) is a cross-sectional view taken along the line H–H' in FIG. 8(*a*). FIG. 8(*c*) is a cross-sectional view taken along the line I–I' in FIGS. 8(*a*) and 8(*b*). FIG. 8(*d*) is a cross-sectional view taken along the line J–J' in FIGS. 8(*a*) and 8(*b*).

As shown in these figures, the wire 16 is formed of a first wire layer 181, a second wire layer 182, and a third wire layer 183. The first wire layer 181 is formed of the same layer as that for the first metal film 13*a* of the TFD element 13 (see FIG. 5(*b*)), the second wire layer 182 is formed of the same layer as that for the main wire 11*a* of the data line 11 and the second metal wire 13*c* of the TFD element 13 (see FIG. 5(*b*)), and the third wire layer 183 is formed of the same layer as that for the pixel electrode 12 (see FIG. 5(*b*)). That is, in this embodiment, the first wire layer 181 is composed of tantalum, the second wire layer 182 is composed of chromium, and the third wire layer 183 is composed of ITO. In this structure, since chromium has high ionicity than tantalum and ITO, the second wire layer 182 is susceptible to corrosion compared to the first wire layer 181 are the third wire layer 183.

The first wire layer 181 and the third wire layer 183 are formed so as to correspond to the entire wire 16 from the conduction portion 16*a* to the end located in the protruding region 10*a* shown in FIG. 6. On the other hand, the second wire layer 182 is only formed in the region of the element substrate 10 opposing the sealing material 30, that is, the region of the element substrate 10 overlapping the sealing material 30.

In more particular, the second wire layer 182 is only formed in an area opposite to the protruding region 10*a* from a boundary 10*b* (hereinafter referred to as wire boundary) that is set inside the periphery of the sealing material 30 by a predetermined length, and the second wire layer 182 is not formed in the protruding region 10*a*. Accordingly, a part of the wire 16 at the conduction portion 16*a* side from the wire boundary 10*b*, that is, the part formed in the region overlapping the sealing material 30, has the structure composed of the first wire layer 181, the second wire layer 182, and the third wire layer 183 laminated to each other in that order, as shown in FIGS. 8(*b*) and 8(*c*). On the other hand, a part of the wire 16 at the protruding region 10*a* side from the wire boundary 10*b* has the structure in which the first wire layer 181 and the third wire layer 183 are only laminated to each other, as shown in FIGS. 8(*b*) and 8(*d*).

In FIG. 8(*a*), the part of the wire 16 formed in the protruding region 10*a* extends at a predetermined angel with respect to the Y direction. Accordingly, larger pitches can be secured in this part compared to the part extending in the Y direction, that is, the part covered with the sealing material 30. In addition, in this embodiment, a width W1 of the part of the wire 16 formed in the protruding region 10*a* is formed larger than that of the part of the wire 16 covered with the sealing material 30.

In addition, in FIG. 8(*b*), the external connection terminals 17 formed on the edge portion of the element substrate 10 has the same layered structure as that of the part of the wire 16 at the protruding region 10*a* side from the wire boundary 10*b*. That is, each external connection terminal 17 has the structure in which the first wire layer 181 composed of tantalum and the third wire layer 183 composed of ITO are laminated to each other.

As described above, in this embodiment, since the second wire layer 182, which is one wire layer of the plurality of wire layers forming the wire 16, is formed in the region overlapping the sealing material 30, and in addition, the first wire layer 181, which is other wire layer, is formed along the entire wire 16, there is an advantage in that corrosion of the wire 16 can be effectively suppressed. That is, although the second wire layer 182 composed of chromium has a low resistance, since the ionicity thereof is high compared to those of the first wire layer 181 composed of tantalum and the third wire layer 183 composed of ITO, the second wire layer 182 has inferior corrosion resistance in the air and has properties susceptible to corrosion.

Accordingly, when the second wire layer 182 is used for forming the part of the wire 16 which is not covered with the sealing material 30 or for forming the external connection terminal 17, due to adhesion of moisture or the like in outside air, a problem may arise in that the second wire layer 182 is liable to corrode. In contrast, according to this embodiment, since the second wire layer 182 having high ionicity is only formed in the region covered with the sealing material 30, adhesion of moisture or the like to the second wire layer 182 can be avoided, and corrosion of the second wire layer 182 can be suppressed.

In addition, tantalum forming the first wire layer 181 and ITO forming the third wire layer 183 have resistances higher than that of the second wire layer 182. Accordingly, when the entire wire 16 is only formed of the first wire layer 181 and the third wire layer 183, the wiring resistance thereof is increased, and display quality of the liquid crystal device may be adversely affected in some cases. In contrast, according to this embodiment, in the part of the wire 16 covered with the sealing material 30, since the second wire layer 182 having a low resistance is formed, there is an advantage in that an increase in wiring resistance can be suppressed.

In addition, in this embodiment, the width of the part of the wire 16 formed in the protruding region 10a is larger than that of the part covered with the sealing material 30. In other words, the width of the part formed of the first wire layer 181 and the third wire layer 183 is larger than the width of the part including the second wire layer 182. Accordingly, although the part in the protruding region 10a is formed of the first wire layer 181 and the third wire layer 183, both of which having relatively high resistances, disadvantages can be avoided in that the wiring resistance of the part described above is considerably increased.

(Embodiment of Method for Manufacturing Electrooptic Device)

Figure 11:
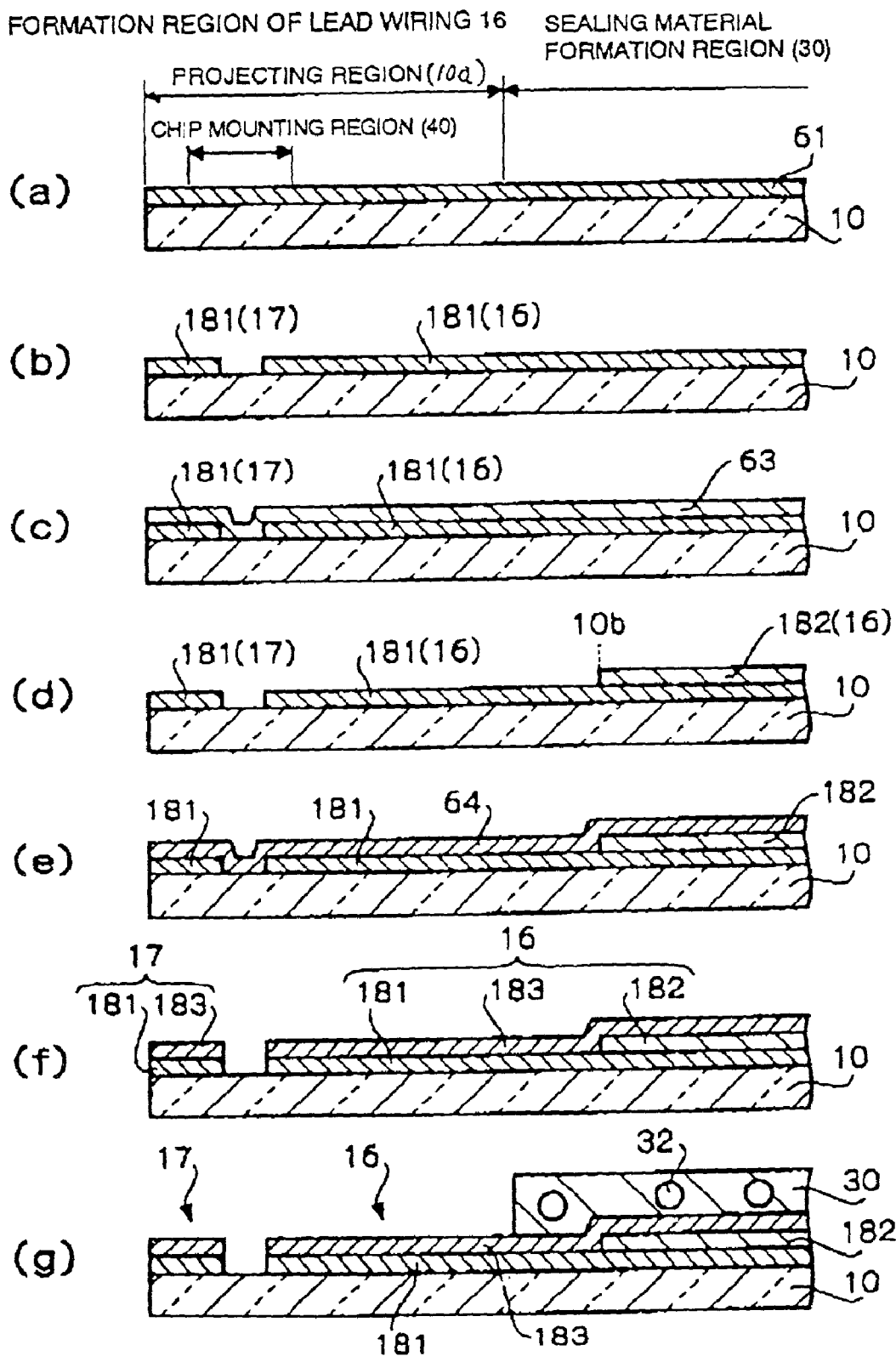
FIG. 11 includes views for illustrating a method for manufacturing an electrooptic device, according to an embodiment of the present invention, in which a method for manufacturing wires is sequentially shown by steps.

Next, a method for manufacturing an electrooptic device will be described. First, methods for manufacturing individual elements, such as the data lines 11, the TFD elements 13, and the like, which are provided on the element substrate 10 shown in FIG. 3, will be described. In FIGS. 9 and 10, a method for manufacturing one display dot 50 on the element substrate 10 is sequentially shown by steps. In addition, in FIG. 11, a method for manufacturing wires 16 is sequentially shown by steps.

As described above, the wire 16 in this embodiment is formed of the same layers as those for the TFD element 13 and the pixel electrode 12. Accordingly, hereinafter, methods for manufacturing the display dot 50 and the wire 16 will both be described. In addition, concerning the regions shown in FIG. 6 in which the wires 16 are to be formed, the positional relation among the protruding region 10a, the region in which the sealing material 30 is to be formed, and the region on which the Y driver IC 40 is mounted is shown in FIG. 11(a).

First, as shown in FIGS. 9(a) and 11(a), a metal film 61 composed of tantalum is formed on the element substrate 10. The formation of this metal film 61 may be performed by, for example, sputtering or electron beam deposition. The thickness of the metal film 61 is optionally determined in accordance with applications; however, in general, a thickness of approximately 100 to 500 nm is used. In addition, before the metal film 61 is formed, an insulating film composed of tantalum oxide ($Ta_2O_5$) or the like may be formed on the surface of the element substrate 10. When the metal film 61 is formed using this insulating film as an underlayer, the adhesion between the metal film 61 and the element substrate 10 is improved, and in addition, the diffusion of impurities from the element substrate 10 to the metal film 61 can be suppressed.

Next, the metal film 61 is patterned by photolithographic treatment and etching treatment. In particular, in the display region V in FIG. 6, the metal film 61 is patterned so as to correspond to the shape of a first metal film 13a of the TFD element 13 as shown in FIG. 9(e1) and to the shape extending along a plurality of the display dots 50 aligned in the X direction as shown in FIG. 9(a1).

In addition, in the region in which the wires 16 are to be formed, in the same step as that for patterning described above, as shown in FIG. 11(b), the first wire layer 181 forming the wire 16 and the external connection terminal 17 are formed. As described above, the first wire layer 181 forming the wire 16 is formed so as to correspond to the entire wire 16 from the conduction portion 16a to the end portion located in the protruding region 10a.

Next, by oxidizing the surface of the metal film 61 formed in the display region V in FIG. 9(a) using an anodic oxidation method, an oxide film 62 composed of oxide tantalum is formed on the surface of the metal film 61, as shown in FIG. 9(b). In particular, the element substrate 10 is immersed in a predetermined electrolyte, and a predetermined voltage is applied across the metal film 61 in the display region V and the electrolyte so as to anodize the surface of the metal film 61. The thickness of the oxide film 62 is suitably determined in accordance with properties of the TFD element 13 and is, for example, approximately 10 to 35 nm. As the electrolyte used for anodic oxidation, for example, a citric acid solution at the concentration of, for example, 0.01 to 0.1 wt % may be used. Subsequently, in order to remove pin holes and to stabilize the film quality, heating treatment is performed for the oxide film 62 formed by the anodic oxidation described above. Related to this, anodic oxidation is not performed for the first wire layer 181 for the wire 16 shown in FIG. 11(b). Accordingly, the oxide film is not formed on the surface of the first wire layer 181 (see FIG. 11(c))

Next, as shown in FIGS. 9(c) and 11(c), a metal film 63 is formed so as to cover the entire surface of the element substrate 10. This metal film 63 is formed by, for example, sputtering so as to have a thickness of approximately 50 to 300 nm. This metal film 63 is a thin-film used for forming the main wire 11a of the data line 11 shown in FIG. 10(c1), the second metal film 13c of the TFD element 13 shown in FIG. 9(e1), and the second wire layer 182 of the wire 16 shown in FIG. 11(f). Accordingly, the metal film 63 in this embodiment is formed of chromium.

Subsequently, in FIGS. 9(c) and 11(c), the metal film 63 is patterned by photolithographic treatment and etching treatment. By the steps described above, in the display region V, as shown in FIGS. 9(d) and 9(d1), the main wire 11a having a portion in which the second metal film 11c has a smaller width and the second metal film 13c of the second TFD element 132 shown in FIG. 9(e1) are formed.

In addition, in the region in which the wires 16 are formed, by patterning the metal film 63 shown in FIG. 11(c), the second wire layer 182 is formed as shown in FIG. 11(d). That is, the second wire layer 182 having the shape corresponding to the part of the wire 16 at the conduction portion 16a (see FIG. 6) side from the wire boundary 10b is formed. In other words, from the metal film 63 which is provided on the first wire layer 181 formed in the previous step, the part (including part on which the external connection terminals 17 are formed) at the protruding region 10a side from the wire boundary 10b is removed.

Next, in FIG. 9(d), by patterning the metal film 61 and the oxide film 62 described above using photolithographic treatment and etching treatment, the first metal film 13a and the insulating film 13b, which form the display dots 50 and the TFD elements 13, are formed, as shown in FIGS. 9(e) and 9(e1). That is, by removing parts of the metal film 61 covered with the oxide film 62, which are provided between the display dots 50 disposed in the X direction, the first metal film 13a and the insulating film 13b are patterned to form an island shape which intersects both the second metal films 11c and the 13c. According to the step described above, the first TFD element 131 and the second TFD element 132 are formed in each display dot 50. FIG. 10(a) is a cross-sectional view taken along the line F–F' in FIG. 9(e1) and shows the cross-sectional shapes of the main wire 11a of the data line 11 and the second metal film 13c of the second TFD element 132.

In addition, when the metal film 61 and the oxide film 62 are patterned in FIG. 9(d), any treatment has not been performed for the first wire layer 181 and the second wire layer 182 for forming the wire 16 shown in FIG. 11(d).

In the example described above, after the patterning treatment is performed for the metal film 63 in FIG. 9(c), the patterning treatment is performed for the metal film 61 and the oxide film 62 in FIG. 9(d); however, in a manner opposite to the above, after the patterning is performed for the metal film 61 and the oxide film 62, the formation and the patterning of the metal film 63 may be performed.

Next, as shown in FIGS. 10(b) and 11(e), a transparent electrode film 64 composed of ITO is formed so as to cover the entire surface of the element substrate 10. This film-formation may be performed by, for example, sputtering. Subsequently, the transparent electrode film 64 is patterned by, for example, photolithographic treatment and etching treatment. Accordingly, in the display region V, as shown in FIGS. 10(c) and 10(c1), the pixel electrode 12 connected to the second metal film 13c of the second TFD element 132 and the subwire 11b forming the data line 11 together with the main wire 11a are formed.

In addition, outside the display region V, as shown in FIG. 11(f), the third wire layer 183, which covers the first wire layer 181 and the second wire layer 182, along the entire wire 16, and the third wire layer 183 covering the first wire layer 181 of the external connection terminal 17 are formed.

Subsequently, the alignment film 56 covering the element substrate 10 in the display region V is formed, and in addition, rubbing treatment is performed for the alignment film 56 in a predetermined direction. Next, in FIG. 11(g), the sealing material 30 containing conductive particles 32 dispersed therein is applied by using a technique, such as screen printing. In the step described above, the sealing material 30 is applied so that the entire second wire layers 182 are covered therewith, that is, so that the second wire layers 182 do not extend to the protruding region 10a.

Figure 12:
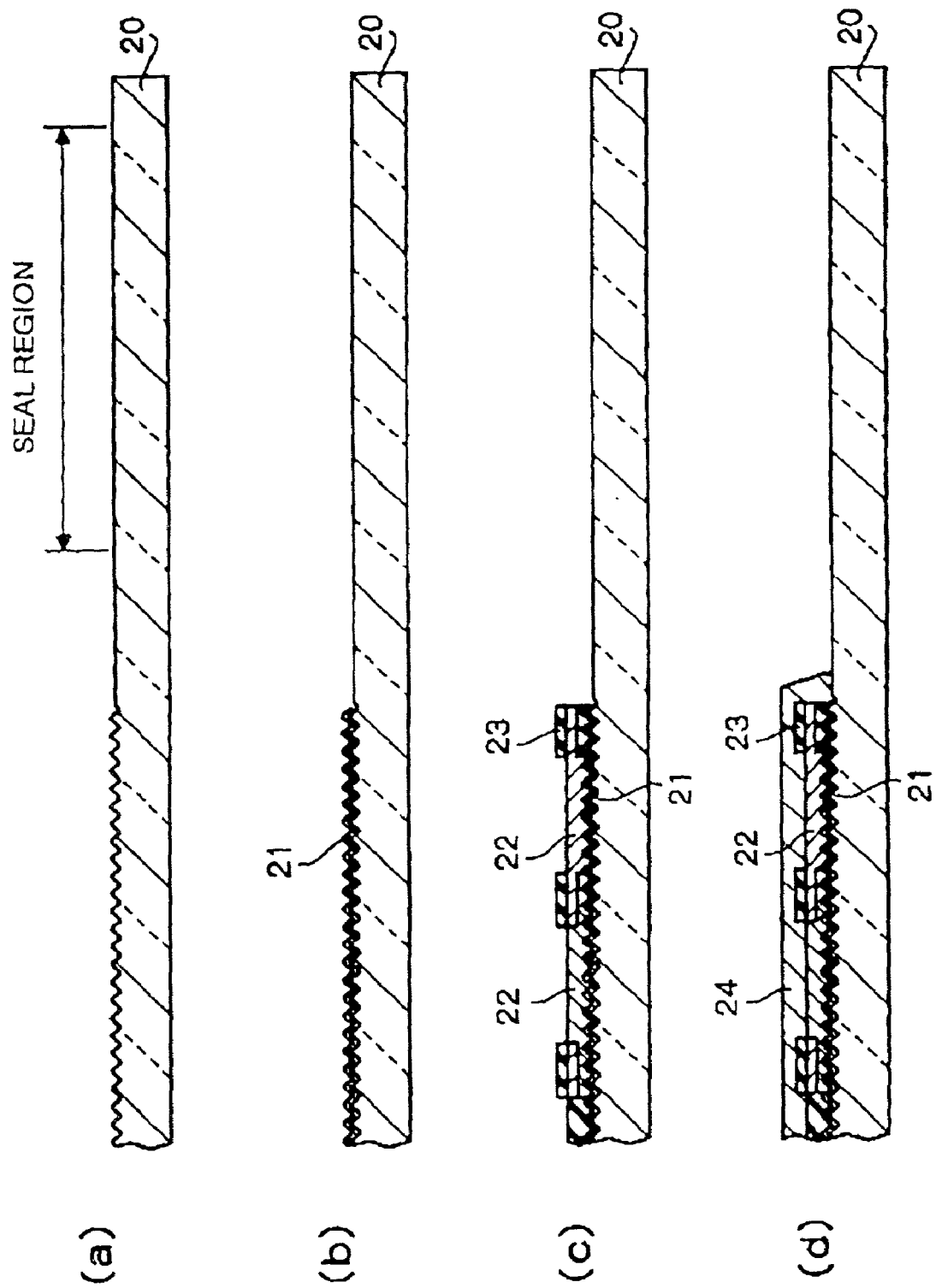
FIG. 12 includes views for illustrating a method for manufacturing an electrooptic device, according to an embodiment of the present invention, in which a method for manufacturing elements on a counter substrate is sequentially shown by steps.
Figure 13:
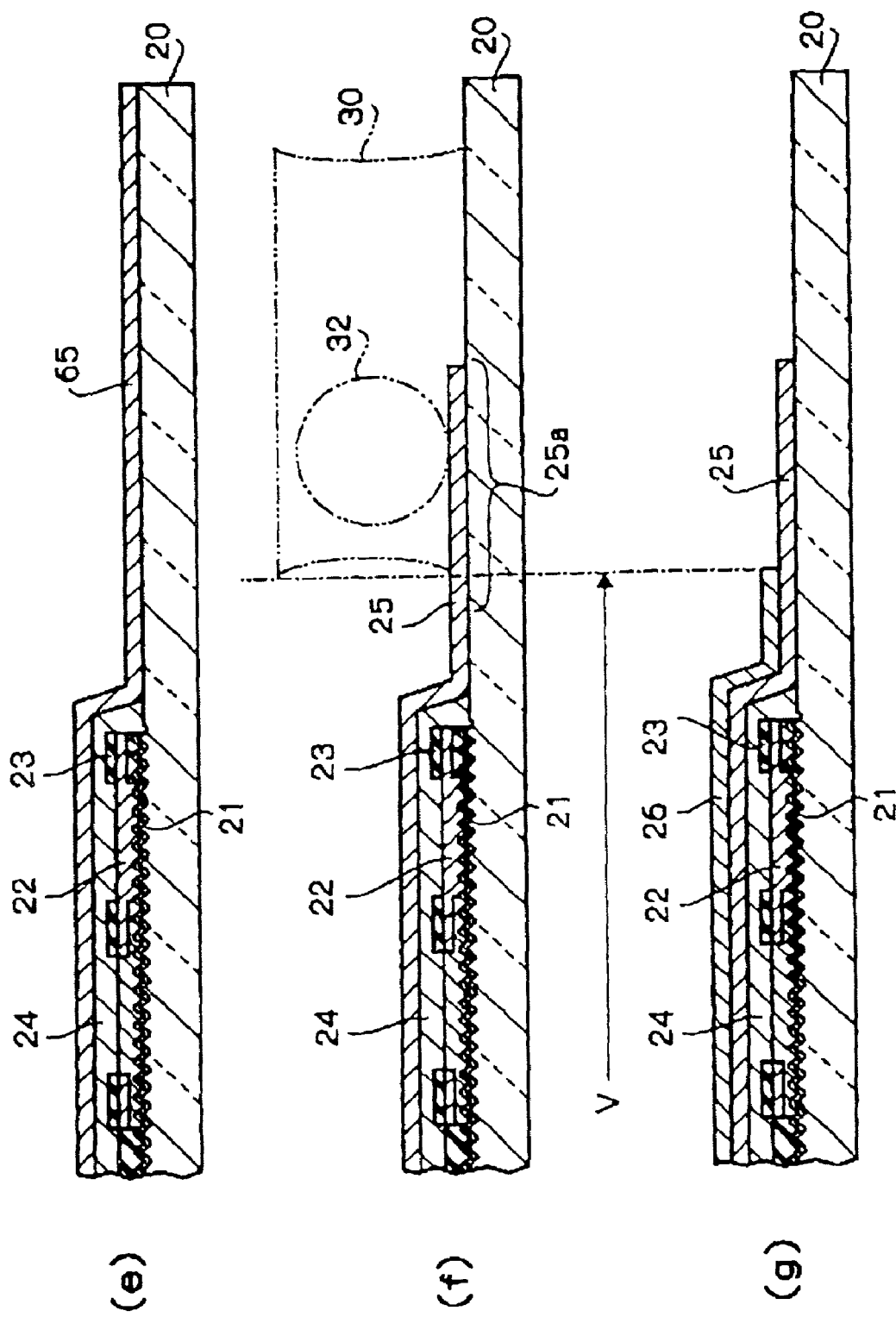
FIG. 13 includes views for showing steps following the steps shown in FIG. 12.

Heretofore, the methods for manufacturing the individual elements on the element substrate 10 shown in FIG. 3 are described. In addition, individual elements provided on the counter substrate 20 are formed by, for example, the steps shown in FIGS. 12 and 13. These figures show cross-sectional views of the vicinity of a region to be covered with the sealing material 30 on the counter substrate 20 shown in FIG. 6. The region at which the sealing material 30 is to be formed is shown in FIG. 12(a) as a "sealing region".

First, in FIG. 12(a), the surface of a region of the counter substrate 20 at which the reflector 21 is to be formed is roughed. In particular, for example, using etching treatment, a number of fine regions of the surface of the counter substrate 20, which have a predetermined thickness from the surface, are selectively removed. As a result, an irregular surface having concave portions corresponding to the regions that are removed and convex portions corresponding to the regions that are not removed is formed on the surface of the counter substrate 20.

However, a method for roughing the surface of the counter substrate 20 is not limited to the method described above. For example, a resin layer composed of an epoxy or an acrylic resin is formed so as to cover the counter substrate 20, and a number of fine regions of the surface of the resin layer are selectively removed by etching. Subsequently, by softening the resin layer by applying heat so as to make sharp portions formed by etching dull, an irregular surface having smooth concaves and convexes may be formed.

Next, a metal thin-film having a light reflection property is formed by sputtering or the like so as to cover the entire surface of the counter substrate 20 in a step shown in FIG. 12(a). This thin-film is formed of a metal such as aluminum, silver, or an alloy primarily composed of the metal mentioned above. Subsequently, by patterning the thin-film using photolithographic treatment and etching treatment, the reflector 21 shown in FIG. 12(b) is formed.

Next, as shown in FIG. 12(c), the color filters 22 and the shading layer 23 are formed on the surface of the reflector 21. That is, after a resin film colored one of color R (red), G (green), and B (blue) with a dye or a pigment, for example, a resin film colored R (red), is formed on the surface of the reflector 21, this resin film is removed except that provided in the regions where the color filters 22 having color R are to be formed and where the shading layer 23 is to be formed in a lattice pattern, that is, the gaps between the display dots 50. Subsequently, by repeating the steps for the other two colors, that is, color G and color B, in a manner similar to that described above, as shown in FIG. 12(c), the color filters having different colors, that is, color R, color G, and color B, and the shading layer 23 formed of these three color layers laminated to each other are formed.

Subsequently, as shown in FIG. 12(d), an epoxy or an acrylic resin material is applied so as to cover the color filters 22 and the shading layer 23 and is then fired, thereby forming the overcoat layer 24. Next, in FIG. 13(e), a transparent conductive film 65 composed of ITO or the like is formed so as to cover the entire surface of the counter substrate 20 on which individual elements described above are provided. This film formation may be performed by, for example, sputtering.

This transparent conductive film 65 is patterned by photolithographic treatment and etching treatment, thereby forming a plurality of scanning lines 25 as shown in FIG. 13(f). The scanning lines 25 are formed to alternately extend to the regions at which the A side and the B side of the sealing material 30 are to be formed, and the conduction portions 25a are formed at the ends of the scanning lines 25. Next, as shown in FIG. 13(g), the alignment film 26 is formed so as to cover the display region V and is then processed by rubbing treatment.

Subsequently, the element substrate 10 and the counter substrate 20 obtained by the steps described above are bonded to each other with the sealing material 30 provided therebetween so that the surfaces of the substrates on which the electrodes are provided oppose each other. In the step described above, in FIG. 6, the relative position of both substrates 10 and 20 is adjusted so that the conduction portions 25a of the scanning lines 25 and the conduction portions 16a of the wires 16 oppose each other with the sealing material 30 therebetween.

Next, in the region surrounded by both substrates 10 and 20 and the sealing material 30, as shown in FIG. 2, liquid crystal is injected via the aperture provided in the sealing material 30, and the aperture portion is then sealed by the plugging material 31. Subsequently, the polarizers, the retardation films, and the like are adhered to the outside surfaces of both substrate 10 and 20, and in addition, the X driver IC 41 and the Y driver IC's 40 are mounted on the protruding region 10a of the element substrate 10 by using a COG technique, thereby obtaining the liquid crystal device 1.

As described above, according to this embodiment, since the wire 16 is formed of the same layers as those for the TFD element 13 and the pixel electrode 12, compared to the case in which the TFD elements 13 and the wires 16 are formed in different steps, the manufacturing process can be simplified, and the manufacturing cost can be reduced.

As the method for preventing corrosion of the second wire layer 182 having poor corrosion resistance, shown in FIG. 8(*b*), for example, a method for covering the part of the wire 16 including the second wire layer 182 with an insulating layer composed of a resin material or the like may be considered. However, in the case described above, a step of forming the insulating layer mentioned above is essential, and hence the manufacturing cost is increased thereby. In contrast, according to this embodiment, since the second wire layer 182 is covered with the sealing material 30, an additional step of forming the insulating film described above is not necessary. As a result, according to this embodiment, without increasing manufacturing cost and complicating manufacturing process, advantages can be obtained in that corrosion of the second wire layer 182 can be suppressed.

Heretofore, one embodiment of the present invention is described; however, the embodiment described above is simply described by way of example, and various modifications of this embodiment may be performed without departing from the spirit and the scope of the present invention. As the modified examples, the following embodiments may be mentioned.

(Second Embodiment of Electrooptic Device)

Figure 14:
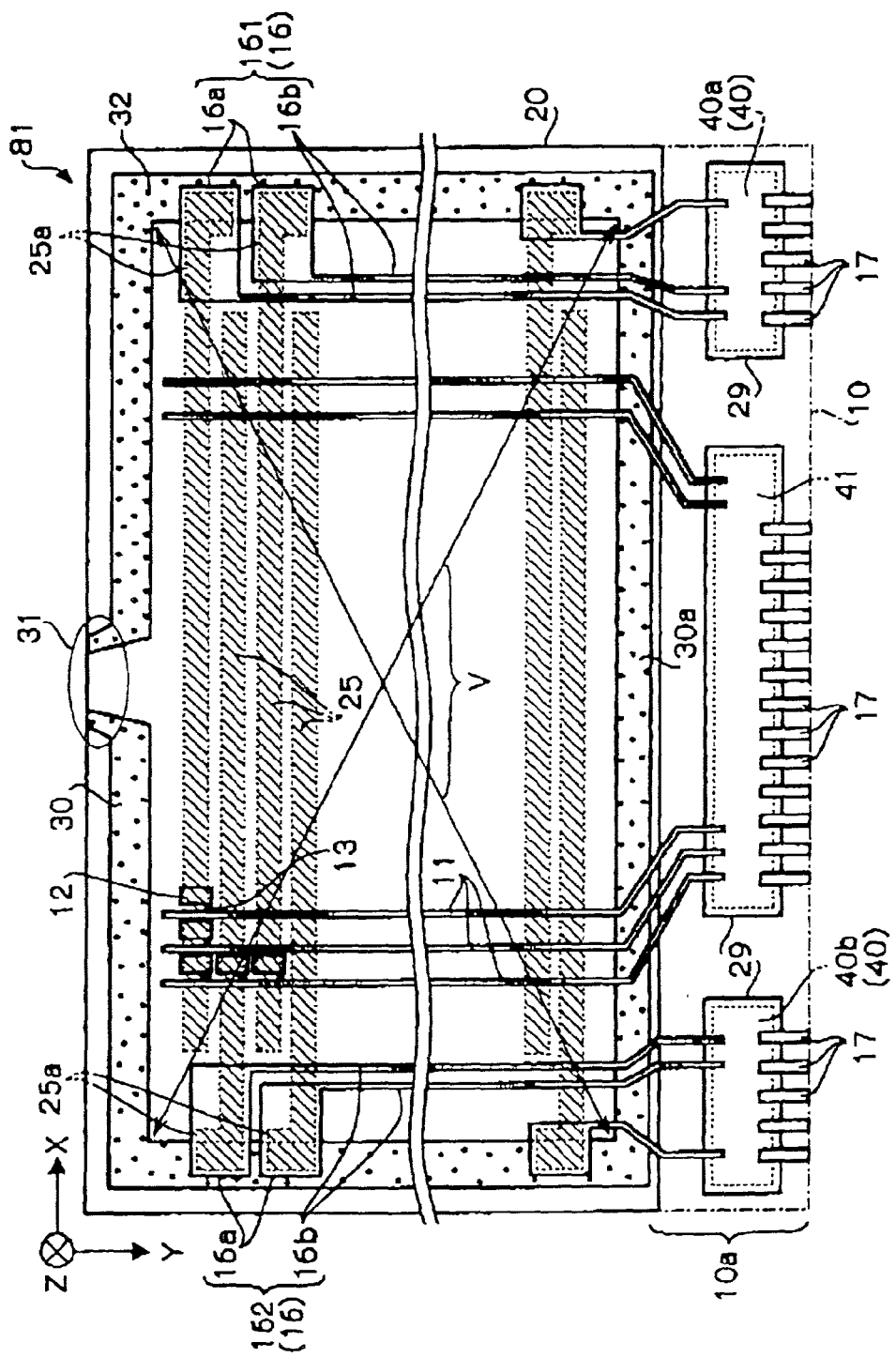
FIG. 14 is a plan, cross-sectional view of a liquid crystal device which is an example of an electrooptic device according to another embodiment of the present invention.

In the embodiment shown in FIG. 6, the part of the wire 16 is covered with one side of the sealing material 30 extending in the direction approximately equivalent to that of the part mentioned above; however, instead of that mentioned above, the structure shown in FIG. 14 may also be used. In FIG. 14, the wire configuration is shown when a liquid crystal device 81 is viewed from the observer side. In addition, the same reference numerals in FIG. 6 designate the same constituent elements in FIG. 14. In FIG. 14, as is the case in FIG. 6, the element substrate 10 is disposed at the front position of the plane and the other elements are disposed at the rear side with respect to the element substrate 10.

In FIG. 14, the wires 16 are formed on the element substrate 10 and are each composed of the conduction portion 16*a* and the extension portion 16*b*. The position at which the conduction portion 16*a* is connected to the conduction portion 25*a* of the scanning line 25 via the conductive particles 32 in the sealing material 30 is the same as that in the embodiment shown in FIG. 6. However, in this embodiment, the extension portions 16*b* are not provided in the region covered with the sealing material 30, that is, the region overlapping the sealing material 30, but are provided in an region surrounded by the inner periphery of the sealing material 30, that is, the display region V. This is the point of this embodiment different from that of the embodiment in FIG. 6.

That is, the extension portions 16*b* of this embodiment are connected to the conduction portions 16*a* in the region surrounded by the sealing material 30 and extend in this region to the protruding region 10*a*. In addition, the extension portions 16*b* extend past the one side 30*a* of the sealing material 30 to the protruding region 10*a* and are connected at the ends thereof to the output terminals of the Y driver IC 40.

Figure 15:
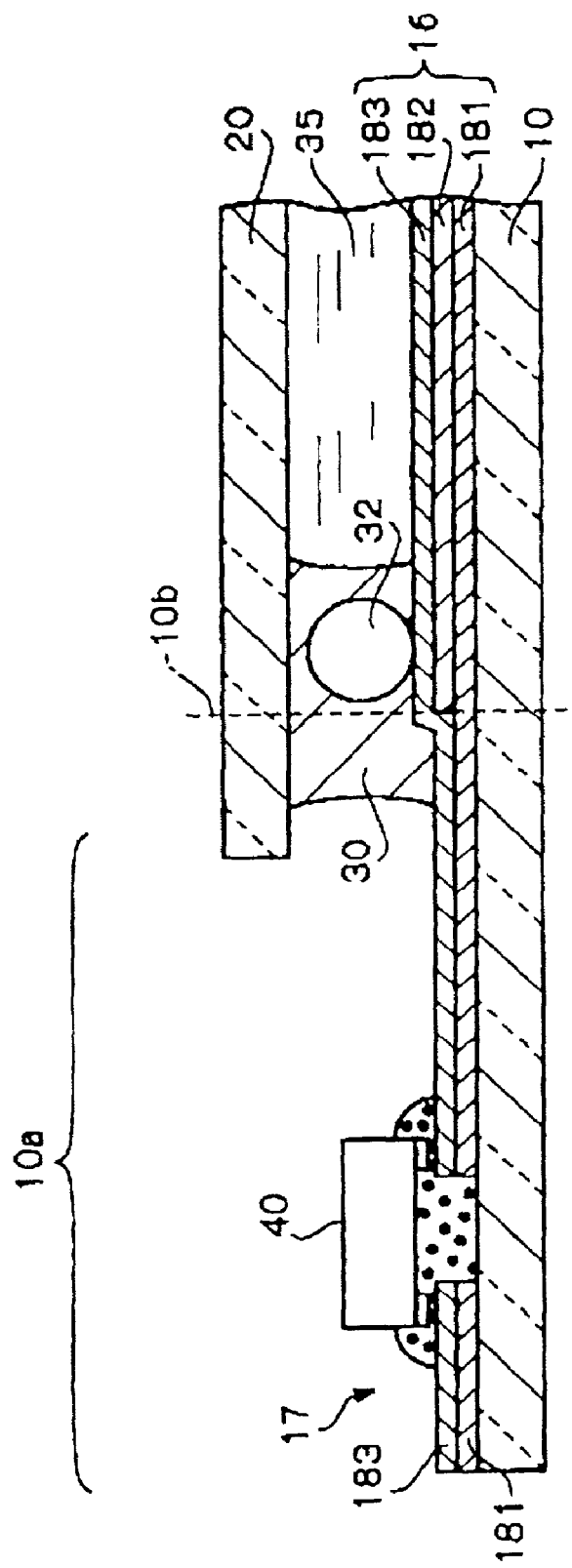
FIG. 15 is a cross-sectional view of a layered structure of a wire according to the embodiment shown in FIG. 14.

FIG. 15 shows a layered structure of the wire 16 of this embodiment and corresponds to FIG. 8(*b*) in the above embodiment. As shown in FIG. 15, the layered structure of the wire 16 is equivalent to that of the wire 16 of the above embodiment shown in FIG. 8(*b*) and is composed of the first wire layer 181 formed of the same layer as that for the first metal film 13*a* of the TFD element 13 shown in FIG. 5(*b*), the second wire layer 182 formed of the same layer as that for the main wire 11*a* of the data line 11 and the second metal film 13*c* of the TFD element 13 shown in FIG. 5(*a*), and the third wire layer 183 formed of the same layer as that for the pixel electrode 12 shown in FIG. 5(*a*).

The first wire layer 181 and the third wire layer 183 are formed along the entire wire 16 from the conduction portion 16*a* in FIG. 14 to the end located in the protruding region 10*a*. That is, both of the first wire layer 181 and the third wire layer 183 are continuously provided in the region overlapping the sealing material 30, the region opposing the liquid crystal 35 (that is, the region surrounded by the inner periphery of the sealing material 30), and the protruding region 10*a* of the element substrate 10.

In contrast, the second wire layer 182 is formed so as not to be provided in the protruding region 10*a* and is continuously provided in the region of the element substrate 10 overlapping the sealing material 30 and in the region opposing the liquid crystal 35. That is, in the above embodiment shown in FIG. 6, since the structure in which the wires 16 are provided in the region covered with the sealing material 30, that is, the region overlapping the sealing material 30 is used, the second wire layer 182 is formed only in the region covered with the sealing material 30. On the other hand, the second wire layer 182 of this embodiment is formed in the region opposing the liquid crystal 35 in addition to the region covered with the sealing material 30. In this embodiment, as is the embodiment shown in FIG. 6, adhesion of moisture or the like in outside air to the second wire layer 182 can be avoided, and hence, corrosion of the second wire layer 182 can be suppressed.

(Third Embodiment of Electrooptic Device)

In the embodiments shown in FIGS. 8(*b*) and 15, the wire 16 comprises the first wire layer 181 and the third wire layer 183; however, the wire 16 may only be formed of one of them. That is, the structure in which the part of the wire 16 provided in the region covered with the sealing material 30 is composed of the first wire layer 181 and the second wire layer 182, and the part provided in the protruding region 10*a* is only formed of the first wire layer 181 may be used. However, as in the embodiment shown in FIG. 8(*b*), when the structure in which the third wire layer 183 is provided to form a laminate together with the first wire layer 181 and the second wire layer 182, an advantage in that wiring resistance can be decreased is obtained.

(Fourth Embodiment of Electrooptic Device)

In the embodiments shown in FIGS. 6 and 14, concerning the wire 16 electrically connected to the scanning line 25, some of the wire layers is covered with the sealing material 30; however, the same structure as described above may be used for the other wires, for example, the data line 11. That is, the main wire 11*a* of the data line 11, composed of chromium, may be formed in the regions covered with the sealing material 30 and the liquid crystal 35, and the subwire 11*b* composed of ITO, which has a superior corrosion resistance, may be formed in the protruding region 10*a* in addition to the regions covered with the sealing material 30 and the liquid crystal 35 so as to be provided along the entire data line 11. The wire in this embodiment, that is, the data line 11, is not electrically connected to any wire on the counter substrate 20. That is, the "wire" in the present invention is not always necessary to be electrically connected to a wire provided on the other substrate.

(Fifth Embodiment of Electrooptic Device)

In the embodiments shown in FIGS. 8(*b*) and 15, the individual wire layers 181, 182, and 183 forming the wire 16 are formed of the same layers as those for the elements in the display region V, that is, the TFD element 13, the pixel electrode 12, and the like. However, the electrooptic device of the present invention is not always necessary to have the structure described above, and the wire 16 may be formed by steps different from those of forming the elements in the display region V.

That is, in the embodiments shown in FIGS. 8(b) and 15, the first wire layer 181 is formed of tantalum, the second wire layer 182 is formed of chromium, and the third wire layer 183 is formed of ITO; however, the materials used for the individual wire layers are not limited thereto. Even when the individual wire layers are formed of materials different from those in the embodiment in FIG. 8(b), it is preferable that a wire layer having high ionicity, that is, inferior corrosion resistance, be formed in the region overlapping the sealing material 30 and that the other wire layers be formed along the entire wire 16.

(Sixth Embodiment of Electrooptic Device)

In the embodiments shown in FIGS. 6 and 14, the element substrate 10 provided with the TFD elements 13 is disposed at the observer side, and the counter substrate 20 provided with the scanning lines 25 is disposed at the rear side. However, in a manner opposite to the above, the element substrate 10 may be disposed at the rear side, and the counter substrate 20 may be disposed at the observer side. In this case, the reflector 21 in FIG. 3 may be formed not on the counter substrate 20 but on the element substrate 10.

In addition, in the embodiment shown in FIG. 3, the color filters 22 and the shading layer 23 are formed on the counter substrate 20 which is a substrate disposed at the rear side; however, these elements mentioned above may be formed on the substrate provided at the observer side. In addition, without providing the color filters 22 and the shading layer 23, the structure in which monochrome display is only performed may be formed. That is, in the embodiment shown in FIG. 3, the element substrate 10 corresponds to the "first substrate" of the present invention and the counter substrate 20 corresponds to the "second substrate" of the present invention; however, each of the "first substrate" and the "second substrate" of the present invention may be disposed at the observer side or at the rear side, and the elements, such as the TFD elements 13, the reflector 21, the color filters 22, and the like, may be provided on either substrate, as required.

In addition, in the embodiment shown in FIG. 3, the reflective type liquid crystal device, which only performs reflective type display, is described by way of example; however, the present invention may be applied to a transmissive type liquid crystal device, which only performs transmissive display. For example, in order to change the structure shown in FIG. 3 to that for a transmissive type device, without providing the reflector 21 on the counter substrate 20 which is a substrate disposed at the rear side, the structure in which incident light from the rear side is transmitted through the liquid crystal 35 and is emitted to the observer side may be formed.

Furthermore, the present invention may be applied to a so-called transflective type liquid crystal device, which can perform both reflective display and transmissive display. In the case described above, for example, as shown in FIG. 3, instead of the reflector 21, a reflector having an aperture in each display dot 50 or a transflective layer (a so-called half mirror) which reflects part of incident light from the surface thereof and transmits the other part of the incident light may be provided, and in addition, a lighting apparatus may also be provided at the rear side of the liquid crystal device.

In the embodiments shown in FIGS. 6 and 14, an active matrix type liquid crystal device using TFD elements which is a two-terminal switching element is described by way of example; however, instead of this, the present invention may be applied to an active matrix type liquid crystal device using TFT (Thin Film Transistor) elements which is a three-terminal switching element or a passive matrix type liquid crystal device provided with no switching elements.

As has thus been described above, when liquid crystal devices have the structure in which the wires extend from the region opposing the sealing material of the substrate, which holds the liquid crystal, that is, the region overlapping the sealing material, past the outer periphery of the sealing material, regardless of the configuration of the other constituent elements, the present invention may be applied to the liquid crystal device described above.

(Embodiment of Electronic Apparatus)

Next, electronic apparatuses using the electrooptic device according the present invention will be described. FIG. 16(a) shows the case in which the present invention is applied to a mobile type personal computer, that is, a portable type personal computer, a so-called notebook type personal computer, and in particular, shows the case in which the present invention is applied to a display portion thereof.

A personal computer 71 comprises a main body 712 provided with a keyboard 711, and a display portion 713 to which the electrooptic device of the present invention is applied. As the electrooptic device used for this personal computer 71, in order to ensure the visibility in a dark place, a transflective electrooptic device, which can perform both reflective display and transmissive display, is preferably used.

Next, in FIG. 16(b), the case in which the electrooptic device of the present invention is applied to a display portion of a mobile phone is shown. A mobile phone 72 shown in the figure comprises a plurality of operation buttons 721, an earpiece 722, a mouthpiece 723, and a display portion 724. The display portion 724 may be formed of the electrooptic device of the present invention. In addition, in order to ensure the visibility in a dark place, a transflective electrooptic device is preferably used as a display portion 724.

In addition to the personal computer shown in FIG. 16(a) and the mobile phone shown in FIG. 16(b), as electronic apparatuses to which the present invention may be applied, there may be mentioned liquid crystal televisions, viewfinder type video tape recorders, direct viewing type video tape recorders, car navigation apparatuses, pagers, electronic notebooks, electronic calculators, word processors, workstations, television phones, POS terminals, and digital still cameras. In addition, a projector or the like using the electrooptic device of the present invention as a light bulb may also be the electronic apparatus of the present invention.

As described above, according to the electrooptic device of the present invention, since corrosion of the wires formed on the substrate can be suppressed, in the electronic apparatus using this electrooptic device, conduction defects can be avoided, and hence, superior reliability can be ensured.

(Seventh Embodiment of Electrooptic Device)

Figure 17:
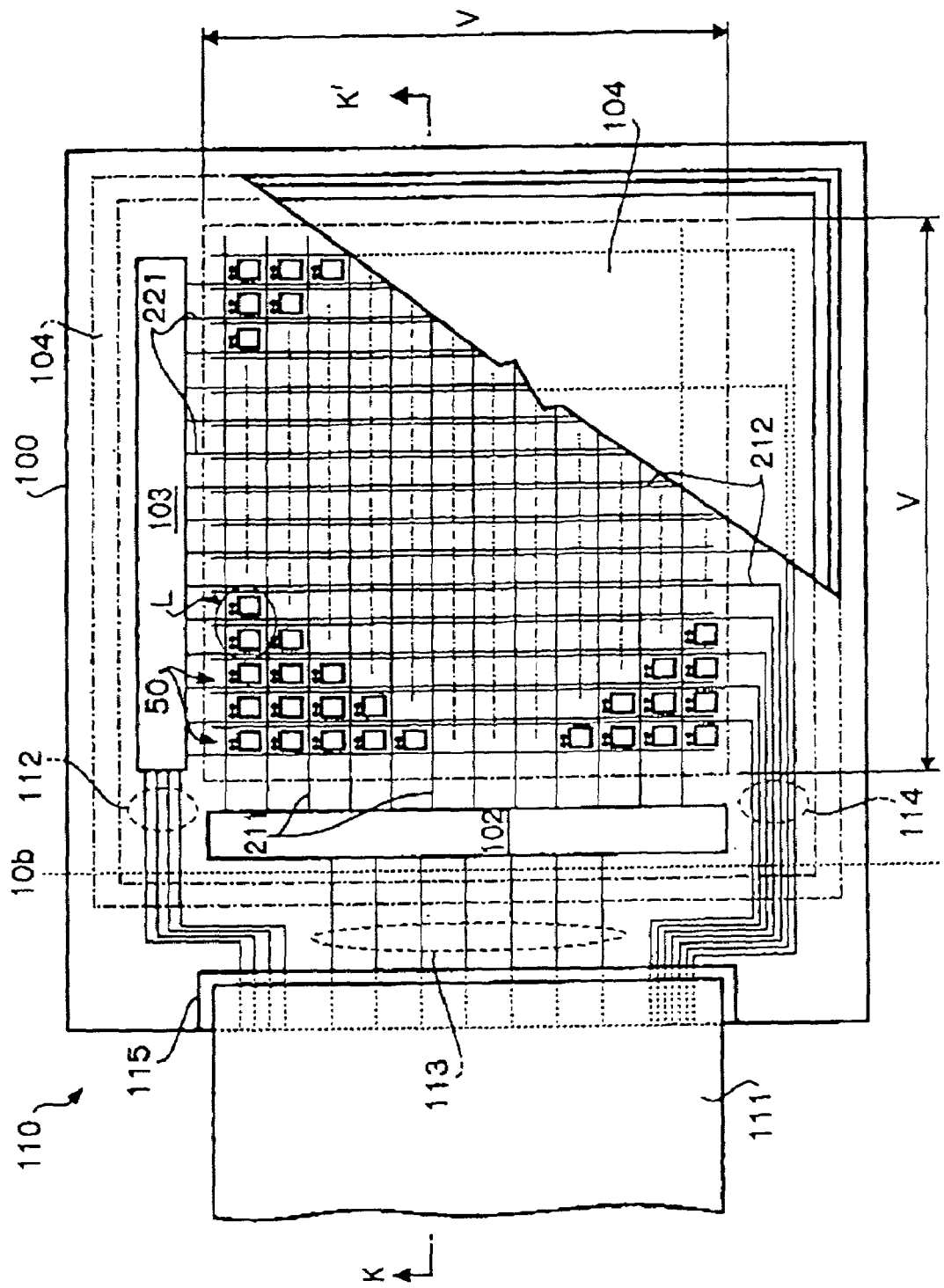
FIG. 17 is a plan, cross-sectional view of an EL device which is another example of an electrooptic device according to an embodiment of the present invention.
Figure 18:
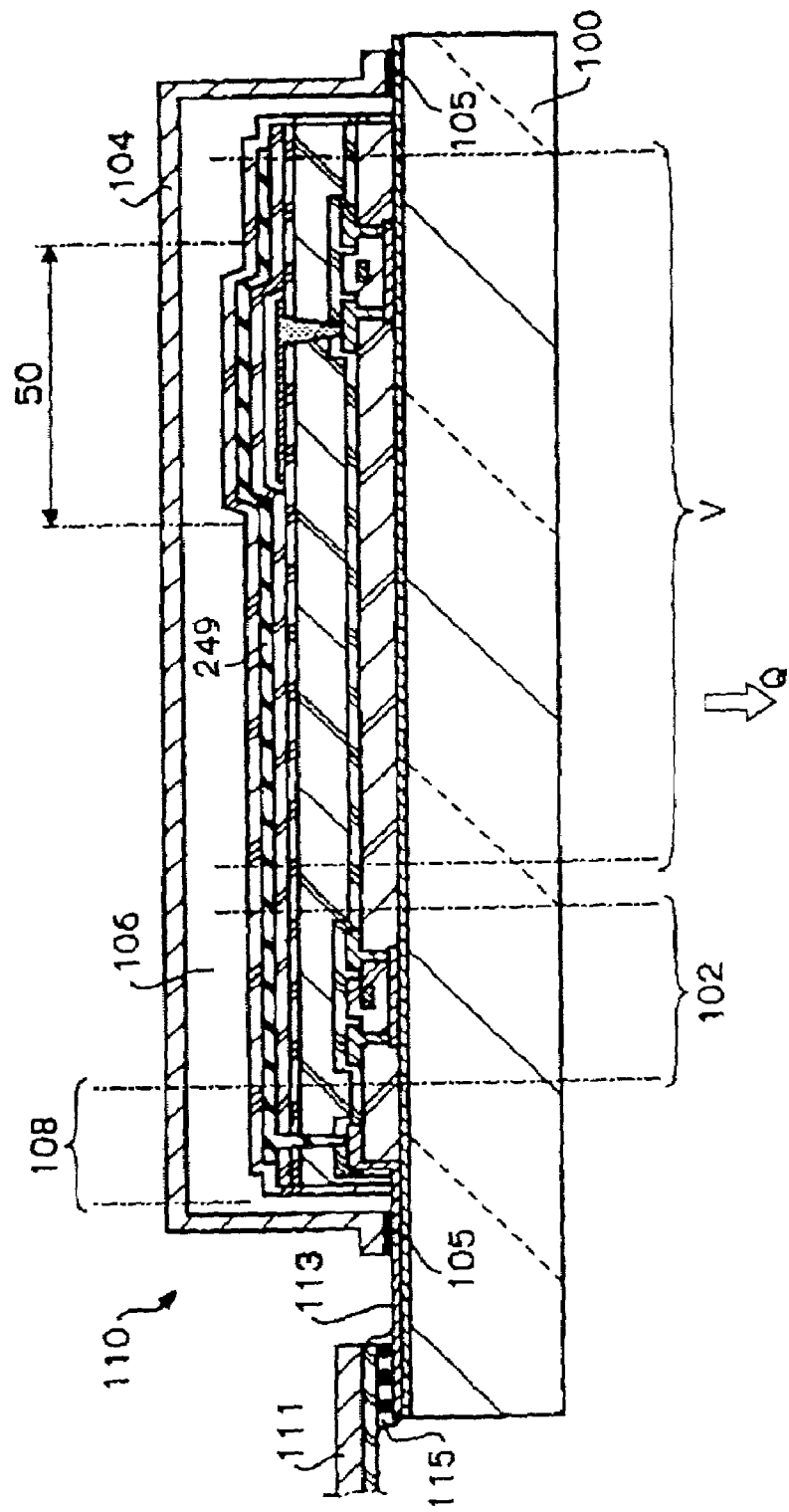
FIG. 18 is a cross-sectional view of the EL device taken along the line K–K' in FIG. 17.

FIG. 17 shows an embodiment in which the present invention is applied to an active matrix type EL (Electro Luminescent) device 110, which is one example of the electrooptic device. In addition, FIG. 18 shows a cross-sectional view of the EL device 110 taken along the line K–K' in FIG. 17.

In these figures, on a substrate 100, a region in which a plurality of pixels is formed, that is, a display region V, a gate side drive circuit 102, and a source side drive circuit 103 are formed. The various wires of the individual driver circuits extend to an FPC 111 via input-output wires 112, 113, and 114 and are then connected to an external apparatus via this FPC 111. This FPC 111 is connected to the edge portion of the substrate 100 with an ACP (Anisotropic Conductive Film) 115.

In the case described above, a housing 104 is provided so as to surround at least the display region V, and preferably, so as to cover the driver circuits 102 and 103 in addition to the display region V. This housing 104 has a shape having a recess portion in which the inside height thereof is larger than the height of the display region or has a sheet shape having no recess portion, and is tightly bonded to the substrate 100 with an adhesive 105 to form a sealed circumstance in cooperation with the substrate 100. In the step described above, EL elements are completely enclosed in this sealed circumstance and are completely unaffected by outside air.

A plurality of the housing 104 may also be formed. In addition, a material for the housing 104 is preferably an insulating material such as glass or polymer. For example, there may be mentioned an amorphous glass such as a borosilicate glass or quartz, a crystallized glass, a ceramic glass, organic resins (for example, acrylic resins, styrene resins, polycarbonate resins, or epoxy resins), or silicone resins. In addition, when the adhesive 105 is an insulating material, a metal material such as a stainless alloy may also be used.

As the adhesive 105, for example, an epoxy-based or an acrylic-based adhesive may be used. In addition, a thermosetting resin or a photocurable resin may also be used as the adhesive. However, a material that prevents, as much as possible, oxygen or moisture to penetrate must be used.

A space 106 between the housing 104 and the substrate 100 is preferably filled with an inert gas such as argon, helium, or nitrogen. In addition, in place of the gas, an inert liquid such as a liquid fluorinated hydrocarbon represented by, for example, perfluoroalkane may also be used. In addition, it is also effective that a desiccant be placed in the space 106, and as this desiccant, barium oxide may be mentioned by way of example.

As shown in FIG. 17, a plurality of display dots 50 independent of each other is disposed in a matrix in the display region V. As shown in FIG. 18, every display dot 50 has a protection electrode 249 as a common electrode. The protection electrode 249 is connected to a part of the input wire 113 in the inside region of the housing 104 and in a region 108 which is in the vicinity of the FPC 111. A predetermined voltage, for example, a ground voltage such as 0 V, is applied to the protection electrode 249 via the FPC 111 and the input-output wire 113.

Figure 19:
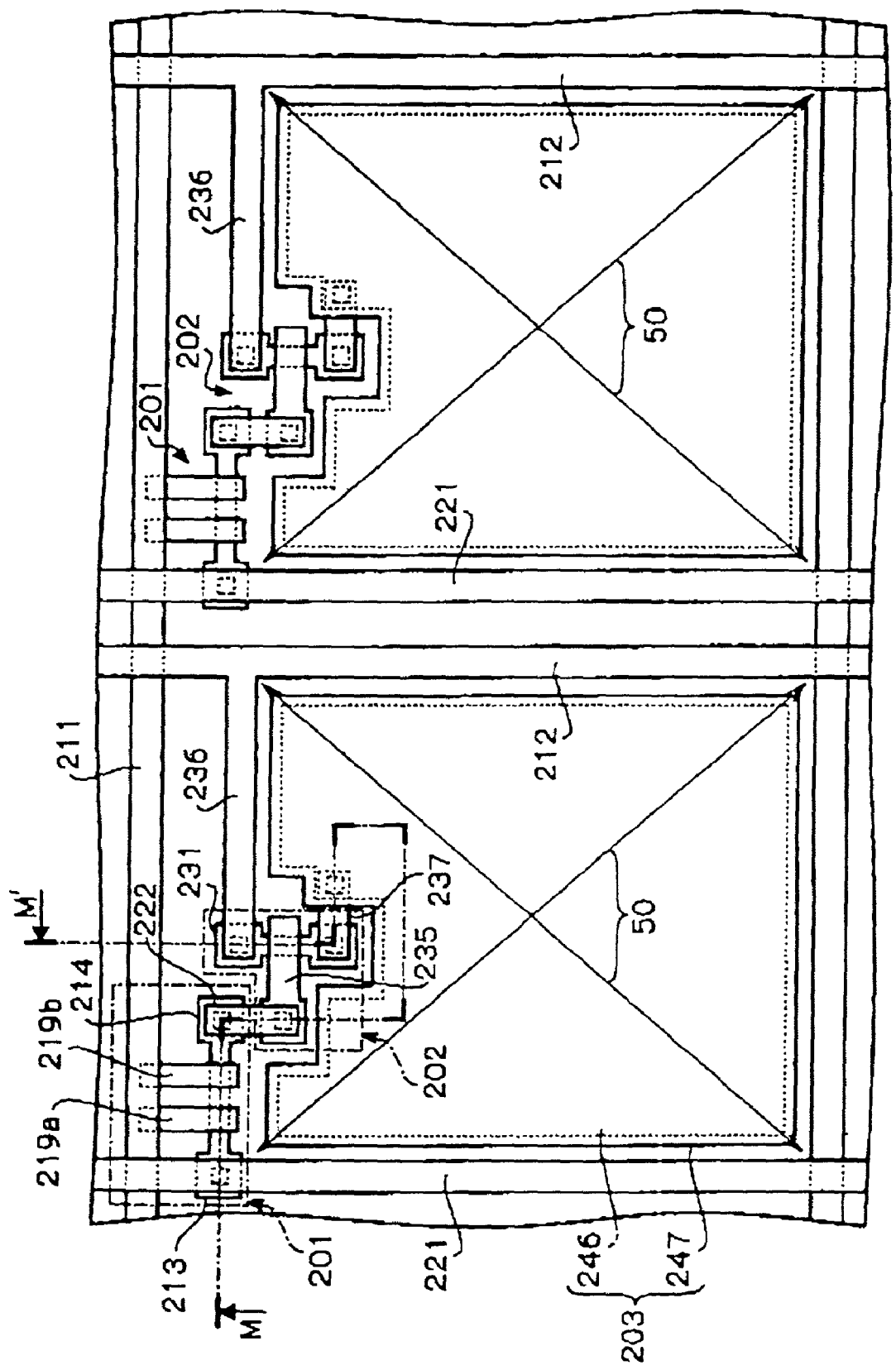
FIG. 19 is an enlarged plan view showing a display dot portion indicated by the arrow L in FIG. 17.
Figure 20:
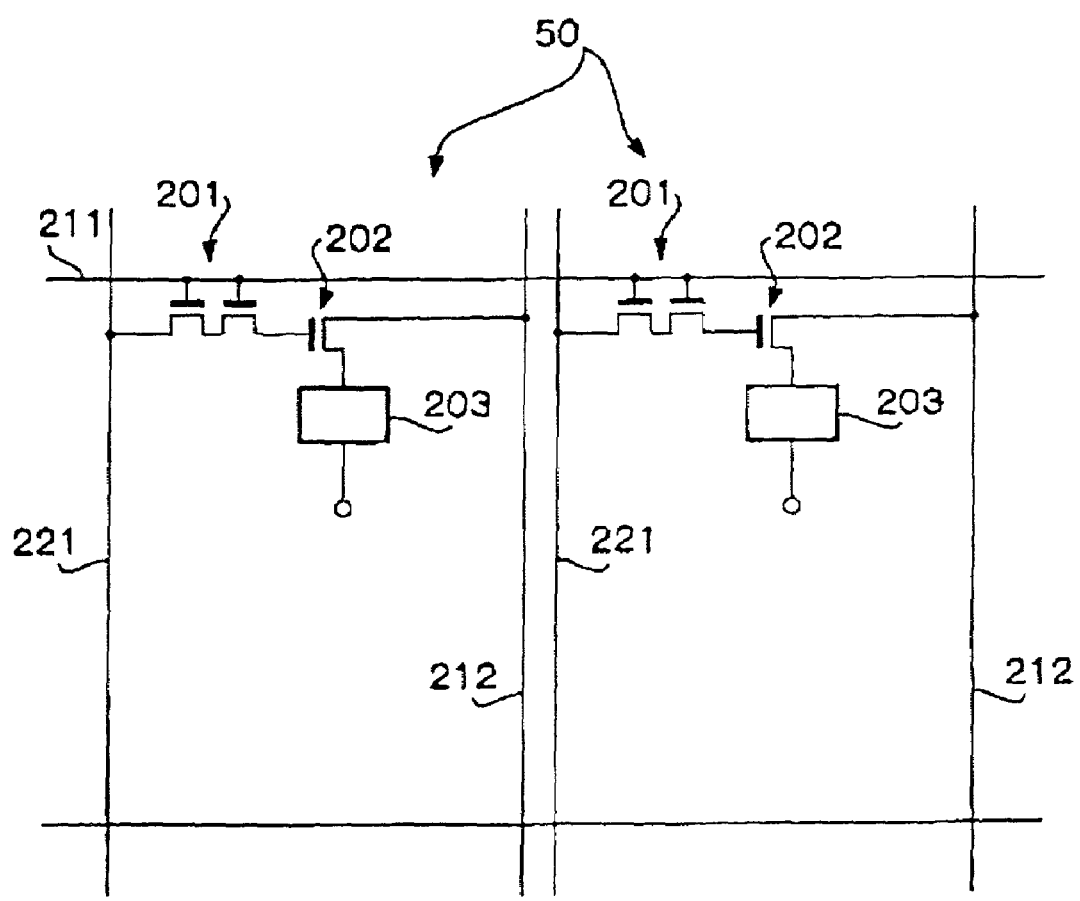
FIG. 20 is an electrical equivalent circuit diagram corresponding to the structure shown in FIG. 19.

FIG. 19 shows two adjacent display dots 50 indicated by the arrow L in FIG. 17. In addition, FIG. 20 shows an equivalent circuit diagram of the electrical circuit structure in these display dots. Furthermore, FIG. 21 is a cross-sectional view of an active element portion for driving the EL element taken along the line M–M' in FIG. 19.

As shown in FIGS. 19 and 20, each display dot 50 comprises a switching TFT 201 functioning as a switching element and a current control TFT 202 functioning as a current-control element which controls the amount of current flowing into the EL element. The source of the switching TFT 201 is connected to a source wire 221, the gate is connected to a gate wire 211, and the drain is connected to the gate of the current control TFT 202.

In addition, the source of the current control TFT 202 is connected to a current control wire 212, and the drain is connected to an EL element 203. The EL element 203 is a light-emitting element having the structure in which an EL layer containing a light-emitting layer is provided between an anode and a cathode. In FIG. 19, a pixel electrode 246 is shown as an approximately square anode, an EL layer 247 containing a light-emitting layer is laminated on the pixel electrode 246, and on this EL layer, the cathode (not shown) is provided as a common electrode commonly used for all display dots 50, whereby this laminated structure described above forms the EL element 203.

Figure 21:
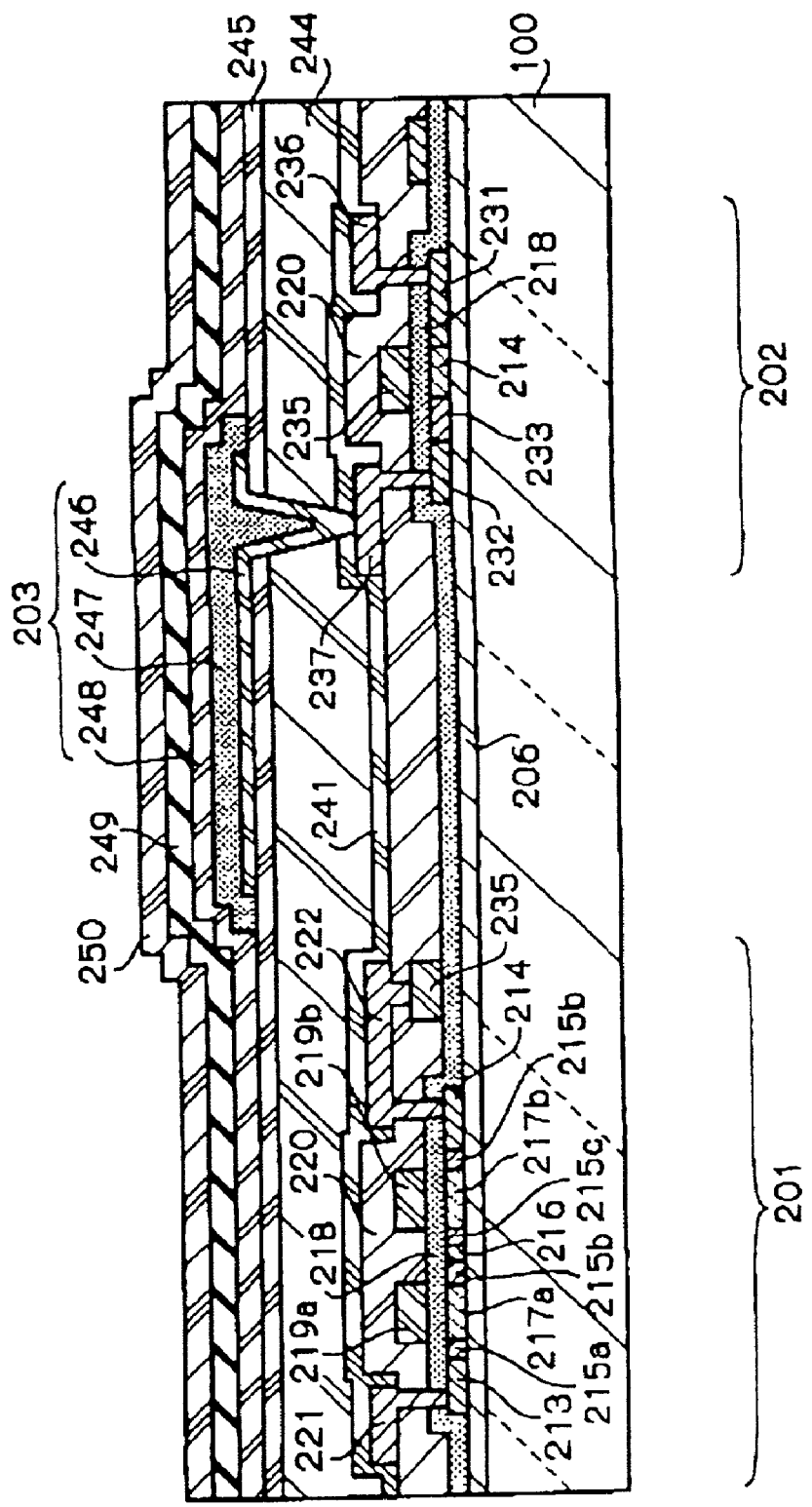
FIG. 21 is a cross-sectional view of a TFT taken along the line M–M' in FIG. 19.

In FIG. 21, an insulating film 206 is formed on the substrate 100 as an underlayer. The substrate 100 is formed of, for example, a glass substrate, a glass ceramic substrate, a quartz substrate, a silicon substrate, a ceramic substrate, a metal substrate, a plastic substrate, or a plastic film.

The underlayer 206 is particularly effective when a substrate containing movable ions or a substrate having conductivity is used, and when a quartz substrate is used as the substrate 100, the underlayer 206 may not be provided. As the underlayer 206, for example, an insulating film containing silicon (that is, Si) may be used. In addition, the underlayer 206 preferably has a heat dissipation function for dissipating heat generated in TFT's.

In this embodiment, two TFT's, that is, the switching TFT 201 functioning as a switching element and the current control TFT 202 functioning as a current control element which controls the amount of current flowing into the EL element, are provided in each display dot. In this embodiment, both TFT's are n-channel type TFT's; however, both TFT's or one of them may be a p-channel type TFT.

The switching TFT 201 has an active layer comprising five elements, that is, a source region 213, a drain region 214, LDD (Lightly Doped Drain) regions 215a, 215b, 215c, and 215d, a highly doped region 216, and channel forming regions 217a and 217b. In addition, the switching TFT 201 has a gate insulating film 218, gate electrodes 219a and 219b, a first interlayer insulating film 220, the source wire 221, and a drain wire 222.

As shown in FIG. 19, the gate electrodes 219a and 219b form a double gate structure, that is, the gate electrodes 219a and 219b are electrically connected to each other with the gate wire 211 composed of a material different from that for the gate electrodes 219a and 219b and having a resistance lower than that of the gate electrodes. In addition to the double gate structure, a so-called multi-gate structure such as a triple gate structure, provided with an active layer including at least two channel forming regions connected in series, may also be used.

The active layer is formed of a semiconductor film including a crystal structure, that is, a single crystal semiconductor film, a polycrystalline semiconductor film, a fine crystal semiconductor film, or the like. In addition, the gate electrode 219a and 219b, the source wire 221, and the drain wire 222 may be formed of any type of conductive film. In addition, in the switching TFT 201, the LDD regions 215a to 215d are formed under the gate insulating film 218 so as not to overlap the gate electrodes 219a and 219b. The structure described above is very effective to decrease an OFF current.

Next, in FIG. 21, the current control TFT 202 has an active layer comprising four elements, that is, a source region 231, a drain region 232, an LDD region 233, and a channel forming region 234; the gate insulating film 218; a gate electrode 235; a first interlayer insulating film 220; a source wire 236; and a drain wire 237. The gate electrode 235 has a single gate structure; however, in place of that, a multi-gate structure may be formed.

In FIG. 21, the drain of the switching TFT 201 is connected to the gate of the current control TFT. In particular, the gate electrode 235 of the current control TFT 202 is electrically connected to the drain region 214 of the switching TFT 201 via the drain wire 222. In addition, the source wire 236 is connected to the current supply wire 212.

The current control TFT 202 supplies current so as to enable the EL element to emit light and, in addition, simultaneously controls the amount of the current so that gray scale display is performed. Accordingly, measures must be taken against degradation caused by hot carrier implantation so that the degradation will not occur when current flows. In addition, when black is displayed, the current control TFT 202 is placed in an OFF state; however, in the case described above, when the OFF current is high, a clear black display cannot be created, and degradation in contrast occurs. Accordingly, the OFF current is preferably suppressed.

In FIG. 21, on the first interlayer insulating film 220, a first passivation film 241 is formed. This first passivation film 241 is formed of, for example, an insulating film containing silicon. This first passivation film 241 functions to protect the formed TFT from alkali metals or moisture. The EL layer, which is finally provided above the TFT, contains alkali metals such as sodium. That is, the first passivation film 241 functions as a protection film that prevents these alkali metals from penetrating into the TFT side.

In addition, when heat dissipation properties are imparted to the first passivation film 241, degradation of the EL layer caused by heat can be prevented. Furthermore, according to the structure shown in FIG. 21, since the substrate 100 is irradiated with light, the first passivation film 241 must have light transmission property. In addition, when an organic material is used as an EL layer, since the EL layer mentioned above is degraded when combined with oxygen, it is preferable that an insulating film likely to evolve oxygen be not used.

On the first passivation film 241, a second interlayer insulating film 244 is formed so as to cover every TFT. This second interlayer insulating film 244 serves to planarize steps formed by the TFT's. As this second interlayer insulating film 244, for example, an organic resin, such as polyimide, polyamide, or acrylic resins, may be used. When sufficient planarization can be performed, inorganic films may naturally be used.

Since the EL layer is very thin, when there is a step on the surface on which the EL layer is formed, light-emitting defect may occur in some cases. Accordingly, it is important that the steps formed by TFT's be planarizes by the second interlayer insulating film 244 in order to enable the EL layer formed thereon to work normally.

On the second interlayer insulating film 244, a second passivation film 245 is formed. This second passivation film 245 serves to prevent penetration of alkaline metals diffused from the EL element. This second passivation film 245 may be formed of the same material as that for the first passivation film 241. In addition, the second passivation film 245 preferably serves as a dissipation layer for dissipating heat generated in the EL elements, and the EL element is prevented from saving heat by this dissipation function.

On the second passivation film 245, the pixel electrodes 246 are formed. This pixel electrode 246 is formed of, for example, a transparent conductive film and serves as an anode of the EL element. After contact holes, that is, apertures, are formed in the second passivation film 245, the second interlayer insulating film 244, and the first passivation film 241, the pixel electrodes 246 are then formed so as to be connected to the drain wires 237 of the current control TFT's 202 via the contact holes.

Next, on the pixel electrode 246, the EL layer 247 is formed. This EL layer 247 is formed so as to have a single layer structure or a multi-layer structure, and in general, the multi-layer structure has been formed in many cases. In this EL layer 247, as a layer directly in contact with the pixel electrode 246, a hole injection layer, a hole transport layer, or a light-emitting layer may be mentioned.

When a two-layer structure composed of the hole transport layer and the light-emitting layer is used, the hole transport layer may be formed of, for example, poly(phenylene vinylene). As the light-emitting layer, cyanopoly (phenylene vinylene) for a red light-emitting layer, poly (phenylene vinylene) for a green light-emitting layer, and poly(phenylene vinylene) or polyalkylphenylene for a blue light-emitting layer may be used.

Next, on the EL layer 247 formed as described above, a cathode 248 is formed, and on the cathode, a protection electrode 249 is further formed. The cathode 248 and the protection electrode 249 are formed by, for example, vacuum deposition. When the cathode 248 and the protection electrode 249 are continuously formed without being exposed to the air, degradation of the EL layer 247 can be suppressed. A light-emitting element formed of the pixel electrode 246, the EL layer 247, and the cathode 248 is the EL element 203.

As the cathode 248, a material containing magnesium (Mg), lithium (Li), or calcium (Ca) having a small work function may be used. The protection electrode 249 is provided to protect the cathode 248 from external moisture or the like and is formed of a material containing, for example, aluminum (Al) or silver (Ag). This protection film 249 also has a heat dissipation effect.

The structure shown in FIG. 21 is a monochromatic light emitting structure in which one type EL element having one of color R, G, and B is formed corresponding to each display dot 50. However, as the light-emitting system, in addition to the monochromatic light emitting system described above, for example, there may be mentioned a system formed of white light-emitting EL elements in combination with color filters, a light-emitting system formed of blue or cyan light-emitting EL elements in combination with a fluorescent material, or a light-emitting system in which EL elements corresponding to R, G, and B overlap each other by using a cathode formed of a transparent electrode. By using these various systems, color display can be performed. In addition, by forming a monolayer of a white light-emitting EL layer, monochrome display can be naturally performed.

On the protection electrode 249, a third passivation film 250 is formed. This third passivation film 250 serves to protect the EL layer 247 from moisture and, when necessary, may also have a heat dissipation function as the second passivation film 245. When an organic material is used for the EL layer, since the organic material may be degraded by the combination with oxygen, it is preferable that an insulating film likely to evolve oxygen be not used for the third passivation film 250.

In this embodiment, as shown in FIG. 17, TFT's having the structure most suitable not only for the display region V but for the driver circuits 102 and 103 are directly formed on the substrate 100, and hence, highly reliable operation can be achieved. In this embodiment, the driver circuits mentioned above may include a shift register circuit, a buffer circuit, a level shifter circuit, a sampling circuit, and the like.

In addition, when digital drive is performed, there may also be mentioned a signal conversion circuit such as D/A converter.

On the substrate 100, in addition to the display region V and the circuit structure such as the driver circuits 102 and 103, logic circuits, such as a signal dividing circuit, a D/A converter circuit, an operational amplifier circuit, or a γ-correction circuit, may also be formed directly on the substrate 100. Furthermore, memory portions and microprocessors may be directly formed on the substrate 100.

Since the EL device 110 of this embodiment is formed as described above, in FIG. 17, one of the scanning signal or the data signal is supplied to the gate wire 211 by the gate side drive circuit 102, and the scanning signal or data signal, different from the signal mentioned above, is supplied to the source wire 221 by the source side drive circuit 103. In addition, the current supply line 212 supplies a current to the current control TFT 202 in each display dot to enable the EL element to emit light.

An appropriate display dot of the plurality of display dots disposed in a matrix in the display region V is selected in accordance with the data signal, and during this selection period, the switching TFT 201 is in an ON state, whereby the data voltage is saved. During non-selection period, the TFT 201 is placed in an Off state, and the voltage is maintained thereby. By these switching and saving operation, appropriate display dots of the plurality of display dots selectively emit light, and this group of the light-emitting dots displays letters, numerals, figures or the like on the rear side of the plane in FIG. 17, that is, in the direction indicated by an arrow Q in FIG. 18.

In FIG. 17, a signal is supplied to the source side driver circuit 102 via the wire 112. In addition, a signal is supplied to the gate side driver circuit 102 via the wire 113. Furthermore, a current is supplied to the current supply line 212 via the wire 114. In this embodiment, a wire boundary 10b is set in the vicinity of one side of the housing 104 at which the wires 112, 113, and 114 extend to the exterior thereof, in which the housing 104 covers the inside of the EL device 110 so as to form a sealed environment unaffected by outside conditions.

The wires 112, 113, and 114 located at a wire extension side when viewed from the wire boundary 10b (that is, the left side in FIG. 17) has the cross-sectional structure as shown in FIG. 8(d) in which a two-layered structure is formed of the first wire layer 181 and the third wire layer 183 provided thereon. On the other hand, the wires 112, 113, and 114 located at the display region V side when viewed from the wire boundary 10b has the cross-sectional structure as shown in FIG. 8(c) in which a three-layered structure is formed of the first wire layer 181, the second wire layer 182, and the third wire layer 183 laminated to each other in that order. That is, the layered structure of the wires 112, 113, and 114 provided inside the wire boundary 10b is different from that provided outside the wire boundary 10b.

For example, when the second wire layer 182, which is only disposed inside the wire boundary 10b (that is, the display region V side), is formed of a material having a low resistance and being susceptible to corrosion, and when the second wire layer 182 described above is formed inside the wire, the wiring resistance can be decreased, and as a result, stable image display can be performed by the EL device 110.

In addition, even when the second wire layer 182 is formed by using a material susceptible to corrosion, since the region in which the second wire layer 182 is formed is the sealed region unaffected by external conditions, the second wire layer 182 susceptible to corrosion is not exposed to outside air, and display defects caused by corrosion generated over the entire wire along the second wire layer 182 can be reliably prevented.

(Other Embodiments)

Heretofore, the present invention has been described with reference to the preferred embodiments; however, the present invention is not limited to those embodiments, and various modifications may be performed without departing from the spirit and the scope of the present invention.

For example, the electrooptic device is not limited to the liquid crystal device and the EL device, and any devices in which wires must be formed on substrates, such as electrophoretic device in which a dispersing medium and electrophoretic particles are enclosed between substrates, may be mentioned as the electrooptic devices.

As described above, according to the present invention, corrosion of the wires formed on the substrate can be suppressed. The entire disclosures of Japanese Patent Application Nos. 2001-117464 filed Apr. 16, 2001 and 2002-100571 filed Apr. 2, 2002 are incorporated by reference herein.

What is claimed is:

1. An electrooptic device comprising:
   a first substrate;
   a second substrate disposed to oppose the first substrate;
   a liquid crystal provided between the first substrate and second substrate;
   a sealing material enclosing the liquid crystal; and
   a wire in direct contact with the sealing material and continuously extending from within the sealing material along one side of the first substrate to and along a protruding region of the first substrate that extends beyond the second substrate comprising:
     a first wire layer made from a metal layer that extends from within the sealing material to and along the protruding region outside the sealing material;
     a second wire layer extending within the sealing material and terminating prior to reaching the protruding region; and
     a third wire layer extending from within the sealing material to and along the protruding region outside the sealing material, the third wire layer at least partially covering the first and second wire layers at least within the sealing material and having a higher resistance and a lower ionicity than at least one of the first and second wire layers, wherein the first and second wire layers are located between the first substrate and the third wire layer.

2. An electrooptic device according to claim 1, wherein one end of the wire provided in the protruding region of the sealing material is connected to an external connection circuit.

3. An electrooptic device according to claim 1, further comprising an electrode provided on the second substrate, wherein the electrode is electrically connected to the wire on the first substrate.

4. An electrooptic device according to claim 1, further comprising:
   a plurality of thin-film diodes each formed of a first metal film, an insulating film, and a second metal film laminated to each other in that order on the first substrate; wherein the first wire layer is formed of the same layer as that for the first metal layer.

5. An electrooptic device according to claim 1, wherein the second wire layer is formed of the same layer as that for the second metal film.

6. An electrooptic device according to claim 1, further comprising: a plurality of thin-film diodes each formed of a first metal film, an insulating film, and a second metal film laminated to each other in that order on the first substrate; wherein the second wire layer is formed of the same layer as that for the second metal layer.

7. An electrooptic device according to claim 1, further comprising:
a plurality of thin-film diodes each formed of a first metal film, an insulating film, and a second metal film laminated to each other in that order on the first substrate; and
pixel electrodes each connected to the second metal film of each thin-film diode.

8. An electrooptic device according to claim 1, further comprising:
a wire formed on the second substrate;
wherein the wire on the first substrate is electrically connected to the wire on the second substrate.

9. An electrooptic device according to claim 8, wherein the wire on the first substrate and the wire on the second substrate are electrically connected to each ether via conductive particles dispersed in the sealing material.

10. An electrooptic device according to claim 1, wherein the second wire layer forming the wire on the first substrate has higher ionicity than that of the other wire layers forming the wire.

11. An electrooptic device according to claim 1, wherein the second wire layer forming the wire on the first substrate has a lower resistance than that of the other wire layers forming the wire.

12. An electrooptic device according to claim 1, wherein the width of a part of the first wire layer on the first substrate, provided in the protruding region of the sealing material, is larger than that of a part of the first wire layer covered by the sealing material.

13. An electronic apparatus comprising an electrooptic device according to claim 1.

14. A method for manufacturing an electrooptic device having a first substrate with a protruding region, a second substrate bonded to the first substrate with a sealing material provided therebetween such that the second substrate opposes the first substrate except for at the protruding region, liquid crystal provided between the first substrate and the second substrate, and a wire in direct contact with the sealing material and continuously formed on the first substrate in the sealing material and on the protruding region, the method comprising:

a first wire layer forming step of forming a first wire layer made from a metal layer, which constitutes the wire, continuously extending from within the sealing material to and along the protruding region outside the sealing material;

a second wire layer forming step of forming a second wire layer extending through the sealing material and terminating prior to reaching the protruding region, which constitutes the wire;

a third wire layer extending from within the sealing material to and along the protruding region outside the sealing material, the third wire layer at least partially covering the first and second wire layers at least within the sealing material and having a higher resistance and a lower ionicity than at least one of the first and second wire layers, wherein the first and second wire layers are located between the first substrate and the third wire layer; and a bonding step of bonding the first substrate to the second substrate with the sealing material provided therebetween.

15. A method for manufacturing an electrooptic device according to claim 14, further comprising:

a step of forming first metal films; a step of forming insulating films on the first metal films, and a step of forming second metal films on the insulating films so as to form a plurality of thin-film diodes on the first substrate;

wherein, in the first wire layer forming step, the first wire layer is formed by the same layer as that for the first metal films of the thin-film diodes at the same time as the first metal films are formed, and in the second wire layer forming step, the second wire layer is formed by the same layer as that for the second metal films of the thin-film diodes at the same time as the second metal films are formed.

16. A method for manufacturing an electrooptic device according to claim 15, further comprising:

a step of forming pixel electrodes, which are provided on the first substrate and which are connected to the second metal films of the thin-film diodes;

wherein the third wire layer is formed by the same layer as that for the pixel electrodes at the same time as the pixel electrodes are formed.

* * * * *